United States Patent
Murakami et al.

(10) Patent No.: US 6,212,164 B1
(45) Date of Patent: Apr. 3, 2001

(54) ATM SWITCH CONGESTION CONTROL METHOD OF CONNECTION SETUP REQUESTS AND PRIORITY CONTROL METHOD FOR RECEIVING CONNECTION REQUESTS

(75) Inventors: Toshihiko Murakami; Masatoshi Takihiro, both of Fujisawa; Tokuhiro Niwa, Ebina; Tomihisa Nishijima, Hadano, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/878,085

(22) Filed: Jun. 18, 1997

(30) Foreign Application Priority Data

Jun. 19, 1996 (JP) .................................................. 8-158576
Feb. 14, 1997 (JP) .................................................. 9-030642

(51) Int. Cl.[7] .................................................. H04L 12/56
(52) U.S. Cl. .................................................. 370/230; 370/462
(58) Field of Search .................................. 370/229, 230, 370/231, 232, 233, 234, 235, 236, 410, 426, 412, 395, 462

(56) References Cited

U.S. PATENT DOCUMENTS

| | | | |
|---|---|---|---|
| 5,596,572 | * 1/1997 | Wille-Fier et al. | .................. 370/395 |
| 5,764,645 | * 6/1998 | Bernet et al. | ........................ 370/395 |
| 5,812,551 | * 9/1998 | Tsukazoe et al. | .................... 370/399 |
| 5,828,653 | * 10/1998 | Goss | ..................................... 370/230 |

OTHER PUBLICATIONS

Performance Evaluation for an ISDN Switching System with Burety Call Attempts, IEICE Technical Report, The Institute of Electronics, Information and Communication Engineers, Nov. 22, 1996. pp. 25–28 (documents provided in Japanese with English abstract).

* cited by examiner

*Primary Examiner*—Min Jung
(74) *Attorney, Agent, or Firm*—Mattingly, Stanger & Malur

(57) ABSTRACT

An ATM switch and a congestion control method are provided to handle connection setup requests from other ATM devices. In the ATM switch, a congestion detecting process detects congestion of a class that has a number of the connection setup requests stored by class in the buffer equal to T(x), a predetermined number of the connection setup requests to be stored for each of the classes. A message discarding process discards the received connection setup request if it belongs to the congested class. Furthermore, a priority control method for receiving connection setup requests is provided to establish connections more efficiently. A branching process detects a port to which the connection setup request is inputted, identifies a priority class which corresponds to the port using a priority table, and stores the connection setup request in one of queues which are provided for each priority class. An extracting process extracts the connection setup request from the queue of the priority class to be extracted according to a predetermined algorithm.

19 Claims, 22 Drawing Sheets

FIG. 2

| CLASS(PORT) 210 | CONNECTION NUMBER 220 |
|---|---|
| 0 | 5 |
| 1 | 10 |
| 2 | 20 |
| 3 | 15 |

| CLASS(PORT) 310 | COUNTER 320 |
|---|---|
| 0 | 0 |
| 1 | 0 |
| 2 | 0 |
| 3 | 0 |

300

M(x,y):MESSAGE ARRAY

FIG.13

| CLASS(AAL TYPE) 1310 | CONNECTION NUMBER T(x) 1320 | COUNTER C(x) 1330 |
|---|---|---|
| 1 | 10 | 0 |
| 2 | 0 | 0 |
| 3/4 | 5 | 0 |
| 5 | 20 | 0 |

| PRIORITY CLASS (2210) | PORT (2220) | DEVICE TYPE (2230) |
|---|---|---|
| 0 | 0 | ATM SWITCH |
| 1 | 1, 2 | LAN SERVER, ROUTER |
| 2 | 3, 4 | SERVER TERMINAL |
| 3 | 5, 6, 7 | USER TERMINAL |

| PRIORITY CLASS (2710) | AAL TYPE (2720) | SERVICE CONTENT (2730) |
|---|---|---|
| 0 | 1 | VOICE, VIDEO |
| 1 | 3/4 | CONNECTION-TYPE DATA |
| 2 | 5 | CONNECTIONLESS-TYPE DATA |
| 3 | OTHER | — |

| PRIORITY CLASS (2210) | PORT (2220) | DESCARDING PRIORITY (2910) | DEVICE TYPE (2230) |
|---|---|---|---|
| 0 | 0 | NONE | ATM SWITCH |
| 1 | 1, 2 | NONE | LAN SERVER, ROUTER |
| 2 | 3, 4 | NONE | SERVER TERMINAL |
| 3 | 5, 6, 7 | 0 | USER TERMINAL |

| PRIORITY CLASS (2210) | AAL TYPE (2220) | DISCARDING PRIORITY (2930) | SERVICE CONTENT (2230) |
|---|---|---|---|
| 0 | 1 | NONE | VOICE, VIDEO |
| 1 | 3/4 | 2 | CONNECTION-TYPE DATA |
| 2 | 5 | 1 | CONNECTIONLESS-TYPE DATA |
| 3 | OTHER | 0 | — |

2920 (2700)

| ATM ADDRESS | HOP NUMBER |
|---|---|
| a | 0 |
| b | 1 |
| c | 2 |
|  |  |

21210 21220 — 21200

ATM SWITCH CONGESTION CONTROL METHOD OF CONNECTION SETUP REQUESTS AND PRIORITY CONTROL METHOD FOR RECEIVING CONNECTION REQUESTS

BACKGROUND OF THE INVENTION

1. Technical Field

This invention relates to an ATM (Asynchronous Transfer Mode) switch, and particularly to a congestion control method and a priority control method during reception of the connection setup requests in an SVC (Switched Virtual Channel) service to establish the connection among the ATM switches on demand.

2. Description of Related Art

The ATM switch is equipped with an ATM interface through which a plurality of ATM devices (ATM apparatus) such as ATM terminals, ATM switches, ATM concentrators, ATM routers etc. are respectively connected. An ATM network comprises a plurality of these ATM devices.

When ATM devices are required to be connected in the SVC service of an ATM switch, the ATM device sends a signaling message requesting a SETUP of the connection to the ATM switch to negotiate a destination, a frequency band and so on, so as to establish the connection between the ATM device and the ATM switch.

When a plurality of the ATM switches exist between a calling ATM device (originator) and the called ATM device (destination), the above negotiation process is executed for every two adjacent ATM devices. To process the signaling messages transmitted from a plurality of the ATM devices, the ATM switch is equipped with a buffer for receiving the signaling messages. The ATM switch stores the signaling messages from the ATM devices in the buffer temporarily and then extracts the signaling message from the buffer to execute signaling processes such as establishment of the connection.

Congestion may occur when a large number of signaling messages in excess of the signaling process capability of the ATM switch are received at the ATM switch because of, for example, booting of all ATM devices, requesting of a short period connection setup by a high performance ATM device, malfunction/failure of ATM devices, and so on. Once the buffer which receives and stores the signaling messages sent from ATM devices has overflowed, all the signaling messages received after the overflow are discarded at cell level or packet level until a condition of the buffer is restored in a conventional ATM switch.

The possibility of overflow may be reduced in the conventional device if a capacity of the buffer for receiving the signaling message is made larger. However, the signaling message may be stored in the buffer for a longer period of time if a larger buffer capacity is implemented. The ATM device which sent the signaling message to request the connection setup usually monitors a time from transmission of the signaling message to receipt of the response message. Thus, if the signaling message is stored for a longer period of time, it is possible for the originator of the signaling message to re-send another signaling message because of overtime delay. Particularly, once congestion has occurred, discarding of the connection setup requests from all ATM devices connected to the ATM switch may cause re-sending of the connection setup requests from these ATM devices. The signaling process capability may also be increased. However, the signaling process capability still has its own limit and may not resolve the congestion problem.

Furthermore, in the ATM switch, each of the signaling messages from ATM devices is processed according to its receiving sequence. The signaling message is provided with information elements defining a type of the connection, such as a type of service to be used, cell speed, etc. Since some types of signaling messages require the use of a fixed frequency band, the signaling message coming after such a signaling message may be rejected because of a lack of available frequency band.

Among ATM devices, there are important devices such as ATM ARP (Address Resolution Protocol) servers, LAN emulation servers, which make interconnections with a conventional LAN on an ATM-LAN system, and devices such as file serves, and printer servers, which are frequently accessed by users. In some cases, it is desirable to process the signaling messages from these ATM devices giving them preference over the signaling messages from ATM devices of general users.

When the connection is established via a plurality of ATM switches, it means that a frequency band to be used has been secured in every one of the ATM switches on the route. If the latter ATM device rejects the connection setup request because of a lack of frequency band or the like, these secured frequency bands in the rest of the ATM switches on the route will be wasted. It also possible that the signaling messages may not be received by the ATM devices on the route.

SUMMARY OF THE INVENTION

The first object of the present invention is to provide an ATM switch and a congestion control method of the connection setup request, which enable handling of the connection setup requests from the ATM devices without being influenced by congestion that has occurred due to a large number of connection setup requests from other ATM devices.

The second object of the present invention is to provide an ATM switch and a priority control method for receiving the connection setup requests, which enable efficient establishment of connections.

The first object of the present invention is accomplished by an ATM switch for exchanging inputted connections, comprising; reception means receiving a connection setup request, storage means storing the connection setup request received by the reception means, establishment means extracting the connection setup request stored in the storage means and establishing the connection according to the extracted connection setup request, detection means detecting a class having a predetermined number of connection setup requests assigned to the class being equal to the number of connection setup requests, which are stored in the storage means and classified into the class, the stored connection setup requests being classified into a plurality of classes, each respectively assigned to the predetermined value, and discard means discarding the connection setup request received by the reception means if the detection means detects the class and the received connection setup request belongs to the class.

In a preferred aspect of the present invention, there is provided a congestion control method of an ATM switch receiving a connection setup request, storing the received connection setup request, extracting the stored connection setup request and establishing the connection according to the extracted connection setup request, comprising the steps of; detecting a class having a predetermined number of connection setup requests pre-assigned to the class being equal to a number of the stored connection setup requests which are classified into the class, the stored connection setup requests being classified into a plurality of the classes, and discarding the received connection setup request if such a class is detected and the received connection setup request belongs to the detected class. Alternatively, in another preferred aspect of the present invention, the congestion control method comprises the steps of; detecting a class having a predetermined number of connection setup requests pre-assigned to the class being equal to a number of the stored connection setup requests which are classified into the class, the stored connection setup requests being classified into a plurality of the classes, and discarding the stored connection setup request if the class is detected and the stored connection setup request belongs to the detected class. Here, the connection setup request to be discarded is the one stored. Therefore the number of the connection setup request to be discarded may be determined beforehand.

According to the present embodiment, it is possible to classify the connection setup request based on the port or the content of the information elements of the setup request message and thus control the congestion in each of the classes. For example, even when a large number of connection setup requests are received in a short period of time due to booting of all ATM devices, or malfunction/failure of ATM devices or the like, the connection setup requests in the other classes may still be received without being influenced by the congestion.

The second object of the present invention is accomplished by an ATM switch for exchanging connections entered, comprising; reception means receiving a connection setup request, distinction means distinguishing a priority corresponding to content of the connection setup request which is received by the reception means by using a condition in which the priority is defined for preferentially receiving the connection setup request in correspondence with the content of the connection setup request, storage means storing the connection setup request for each of the priorities distinguished by said distinction means, extraction means extracting the connection setup request corresponding to the priority to be extracted according to an algorithm which is defined based on the priority for extracting the connection setup request, and establishment means establishing the connection according to the extracted connection setup request.

According to the present invention, it is possible to establish the connection efficiently according to the priority since the connection setup request is extracted according to the predetermined priority assigned in correspondence with the content of the connection setup request before the establishment of the connection.

The priority may be defined, for example, by the ports from which the connection setup request is received, or defined in correspondence with the predetermined information element parameter added to the connection setup request. Alternatively, the priority may be defined in correspondence with a number of external devices through which the connection setup request passed, the number corresponding to a originator of the connection setup request.

BRIEF DESCRIPTION OF THE DRAWINGS

FIG. 2 is a schematic diagram of the connection number setup table;

FIG. 3 is a schematic diagram of the receive counter (initial state);

FIG. 13 is a schematic illustration of a connection setup table;

FIG. 15 a schematic illustration of a priority table;

FIG. 20 is a schematic illustration of a priority table;

FIG. 22A is a schematic illustration of a discarding priority table classified by port;

FIG. 22B is a schematic illustration of a discarding priority table classified by AAL type;

DESCRIPTION OF THE PREFERRED EMBODIMENTS

Embodiments corresponding to the first object of the present invention will now be explained with reference to FIGS. 1 to 13. First described will be the congestion control method in the ATM switch where the congestion is classified according to the port.

Figure 1:
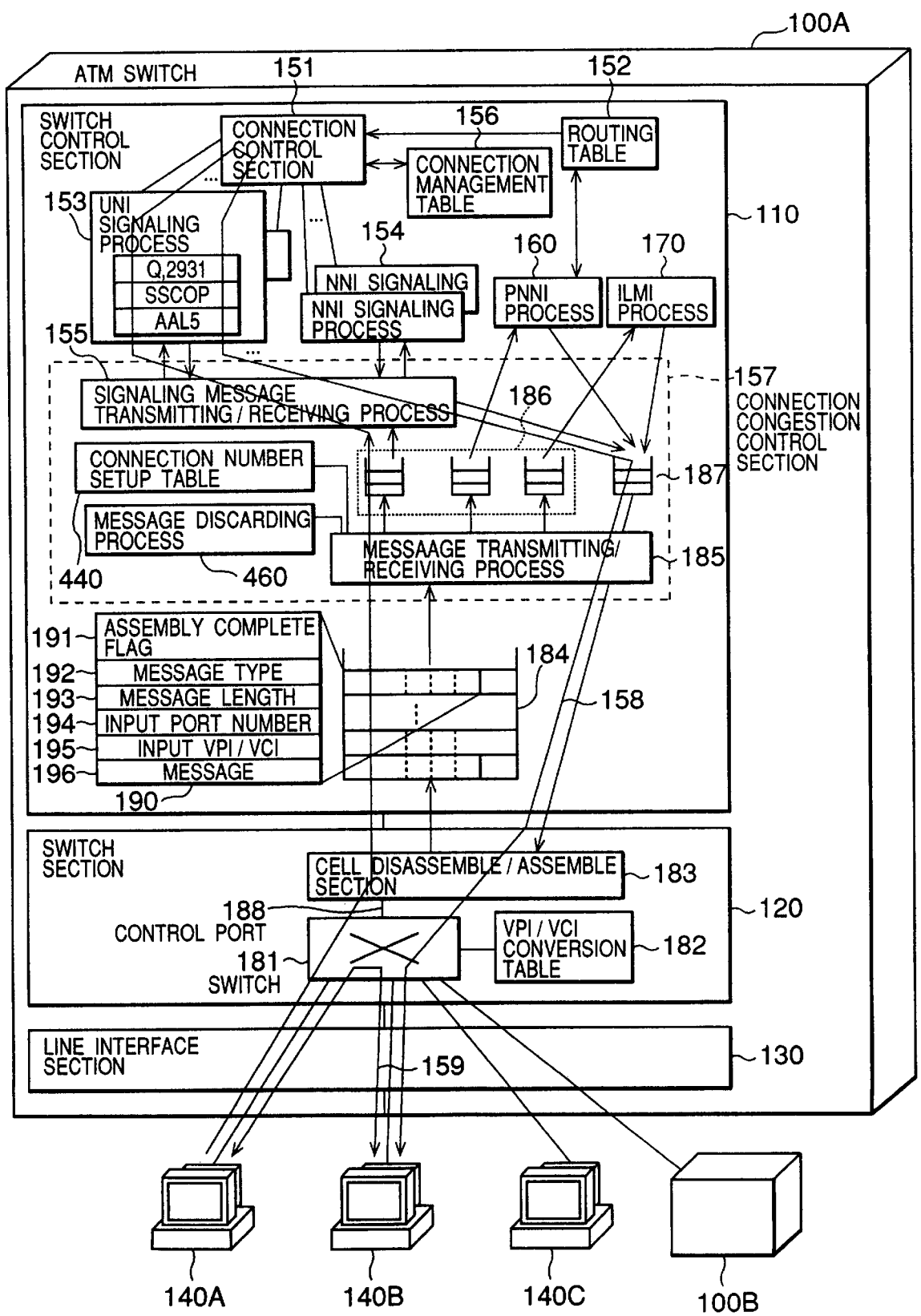
FIG. 1 is a schematic illustration showing a configuration and basic processes of the ATM switch.

FIG. 1 shows a configuration of an ATM switch 100 to which the present invention is applied. The ATM switch 100 comprises three major sections, i.e. a switch control section 110 for controlling the switch, a switch section 120 and a line interface section 130. The line interface section 130 is equipped with a plurality of ports of various physical specifications for connecting ATM terminals 140A, 140B, 140C or ATM switch 100B. When the ATM terminal 140 is connected the port, the connection specification in between is based on UNI (User-Network Interface). When the ATM switch 100 is connected to the port, the connection specification in between is based on NNI (Network-Network Interface). The ATM Forum and the ITU-T (International Telecommunication Union-Telecommunication Standardization Sector) are working on the standardization of these connection specifications. Further, each port also functions as reception means for receiving the connection setup request from each ATM terminal.

The switch section 120 is provided with a VPI (Virtual Path Identifier)/VCI (Virtual Channel Identifier) conversion table 182 for converting routing information according to the established destination, a cell disassemble/assemble section 183 for disassembling and assembling a cell, and a switch 181 for exchanging the connections.

The switch control section 110 includes a message receiving buffer 184 functioning as storage means for storing the signaling message, a connection congestion control section 157 for controlling the connection congestion in each class, a UNI signaling process 153 for executing a UNI signaling process, a NNI signaling process 154 for executing an NNI signaling process, a connection control section 151 for controlling connections, a routing table 152 for storing ATM addresses and corresponding connection ports, a PNNI (Private Network-to-Network Interface) process 160 for setting the routing table 152, a ILMI (Interim Local Management Interface) process 170 for setting ATM addresses to ATM terminals during the initialization and a connection management table 156 for being referenced by the connection control section 151. The UNI signaling process 153, the NNI signaling process 154 and the connection control section 151 together function as establishment means for establishing the connection.

The connection congestion control section 157 includes a message transmitting/receiving process 185 which transmit/receives the message and is provided with detection means for detecting the congestion, a signaling message receiving buffer 186 for temporarily storing the received messages, a signaling message transmitting/receiving process 155 for transmitting and receiving the signaling message with the UNI signaling process 153 and the NNI signaling process 154, a message transmitting buffer 187 for temporarily storing the messages to be transmitted, a message discarding process 460 which is discard means for discarding the messages during the congestion, a connection number setup table 440 for defining a number of connections which the signaling message receiving buffer 186 is capable of memorizing for each class and for counting a number of connections stored in the signaling message receiving buffer 186 for each class. The signaling message receiving buffer 186 is provided for each type of protocol process. As shown in FIG. 1, one of the signaling message receiving buffers is provided for the UNI signaling process 153 and the NNI signaling process 154, and one of the signaling message receiving buffers is provided for each of the PNNI process 160 and the ILMI process 170. The message transmitting/receiving process 185 detects a message type included in the message, determines the protocol corresponding to the message type, and stores the message in the signaling message receiving buffer corresponding to the protocol process. Further, the message transmitting/receiving process 185 counts a number of the messages stored in the signaling message receiving buffer for each class (in this example, for each port to which the messages are inputted) using a counter, compares the counted number and a predetermined number of messages for each class, declares detection of congestion if both numbers are the same, and sends messages to the message discarding process 460 to discard the received messages when congestion has been detected.

An overview of procedure is described with reference to FIG. 1 using an example in which the ATM terminal 140A tries to communicate with the ATM terminal 140B using the SVC service. The ATM addresses are assigned to the ATM terminals 140A and 140B by the ILMI process 170 during the initialization, and ports which correspond to these ATM addresses are registered in the routing table 152 by the PNNI process 160.

The ATM terminal 140A transmits the connection setup request message (hereafter called SETUP message) for the ATM terminal 140B via a signaling channel which is provided for each port. VPI/VCI=0/5 is used as a default value of the standard specification for the signaling channel. The signaling channel is switched to a control port 188 by the VPI/VCI conversion table 182. In the cell disassemble/assemble section 183, the cell designated to the control port 188 is stored in the message receiving buffer 184, and a plurality of the cells designated for each destination are assembled into single frame formation to form a service data unit. Further, the cell disassemble/assemble section 183 adds an input port number of the port to which the message was inputted to a field of the input port number 194 in the message 190. The input port number of the port to which the message is inputted is given by the switch 181. Since the message receiving buffer 184 is used for disassembling and assembling of the cell, it is provided with ample capacity for storing a plurality of the service data units. In the message receiving buffer 184, there are messages which have completed being assembled, and uncompleted ones. The message 190 in the message receiving buffer 184 is stored with such information indicated by numerals 191 to 196 as shown in FIG. 1. In the cell disassemble/assemble section 182, an assembly complete flag 191 is set for messages for which assembly has been completed. The message transmitting/receiving process 185 checks if assembling of the message has been completed or not by detecting the assembly complete flag 191 of the message stored in the message receiving buffer 184, then detects the message type 192 of the message for which assembly has been completed, and transfers the message to the signaling message receiving buffer 186 of the signaling process corresponding to the detected message type. The signaling message transmitting/receiving process 155 extracts the message from the signaling message receiving buffer 186, and sends the message to the UNI signaling process 153 or the NNI signaling process 154. As a result of the process described above, the SETUP message from the ATM terminal 140A is transferred to the UNI signaling process 153. In the connection control section 151, the UNI signaling process 153 of the ATM terminal 140B, the calling party, is identified with reference to the routing table 152. Further, checking operations are executed to see, for example, whether or not the necessary resources are available for establishing a new connection using the connection management table 156. If the necessary resources are available, the SETUP message is transmitted from the ATM switch 100A to the ATM terminal 140B. According to a series of the processes 158, the connection 159 may be established for communications between the ATM terminal 140A and the ATM terminal 140B.

The congestion control operation of the present invention will now be described. In the following, the congestion control operation is illustrated by an example of the ATM switch 100 provided with four ports which are classified into four classes respectively. The class is defined in advance by the connection number setup table 440 in correspondence with each port.

FIG. 2 shows a connection number setup table 200, an example of the connection number setup table 440 shown in FIG. 1. The connection number setup table 200 defines a number of connections the signaling message receiving buffer 186 can store for each class. The connection number setup table 200 has a plurality of entry sets provided in correspondence with a respective one of the four classes, each set comprising the class 210 and the connection number 220 of the corresponding class. The connection number 220 is a number of messages the signaling message receiving buffer can memorize, and may be set by a system supervisor. In this example, the setup values are defined so as that the ports 0, 1, 2, 3 respectively correspond to the ATM terminals 140A, 140B, 140C, and the ATM switch 100B.

FIG. 3 shows a receiving counter 300 which is an embodiment of the connection number setup table 440 shown in FIG. 1. The receiving counter 300 counts the messages stored in the signaling message receiving buffer in each of the classes. The receiving counter 300 has a plurality of entry sets, each set comprising the class 310 and the counter 320 for the corresponding class. In the counter 320, initial values are set to 0. The connection number setup table 440 shown in FIG. 4 may also be defined by adding an entry of the counter 320 to the connection number setup table 200 shown in FIG. 2.

Figure 4:
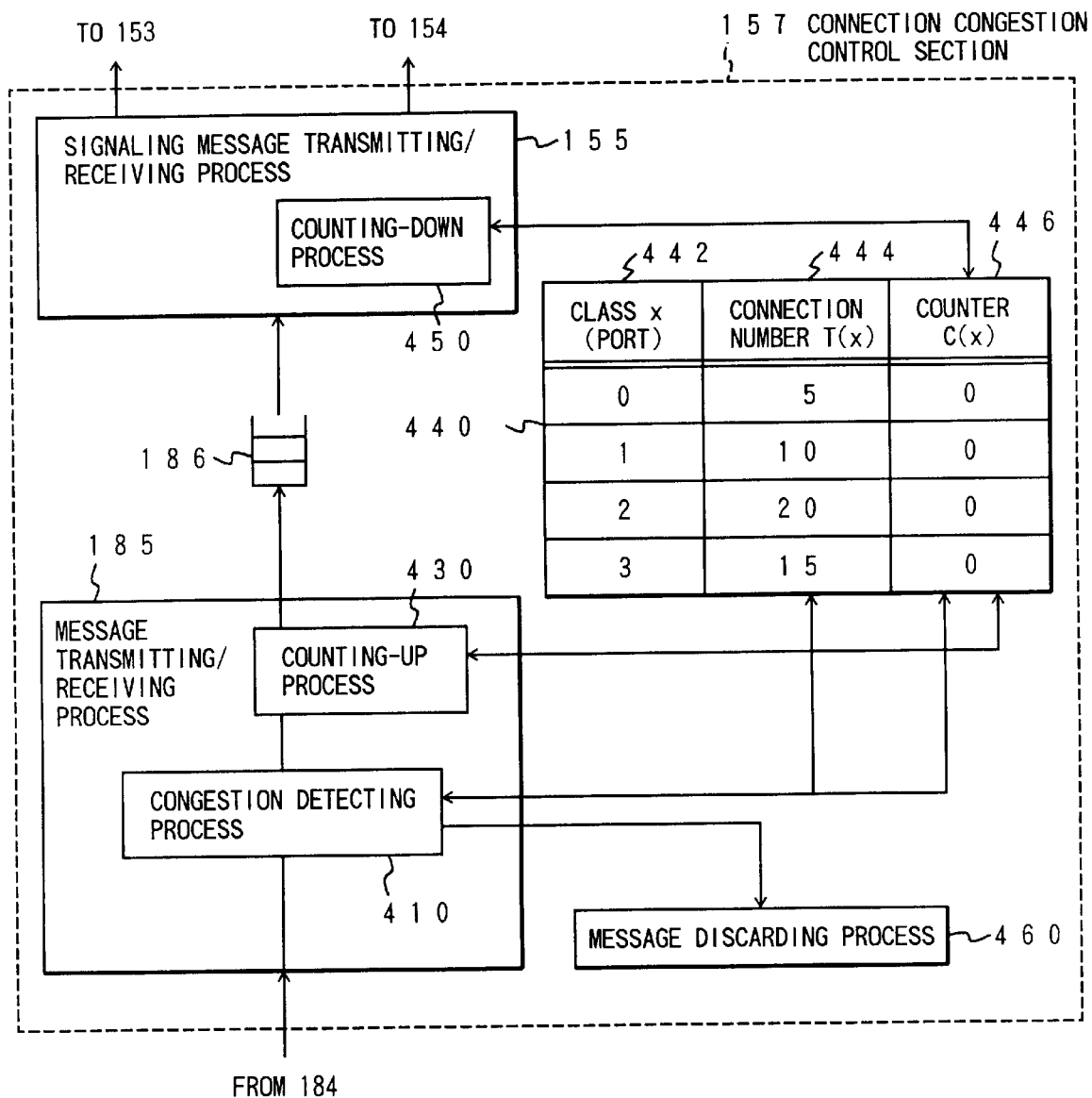
FIG. 4 is a schematic illustration showing a principle of the congestion control method of the connection setup request.

FIG. 4 shows a configuration of the connection congestion control section 157 of the present invention. The connection congestion control in the present invention is executed at the connection congestion control section 157. As shown in FIG. 4, the connection setup table 200 and the receiving counter 300 shown in FIGS. 2, 3 are now defined as the connection number setup table 440 including entry sets, each comprising the class x 422, the connection number T(x) 444 and the counter C(x) 446. The message transmitting/receiving process 185 includes a congestion detecting process 410 for detecting the congestion and a counting-up process 430 to increment the counter C(x) 446. The message discarding process 460 for discarding the messages when the congestion is detected is connected to the congestion detecting process 410. The signaling message transmitting/receiving process 155 includes a counting-down process 450 for decrementing the counter C(x) 446.

Figure 5:
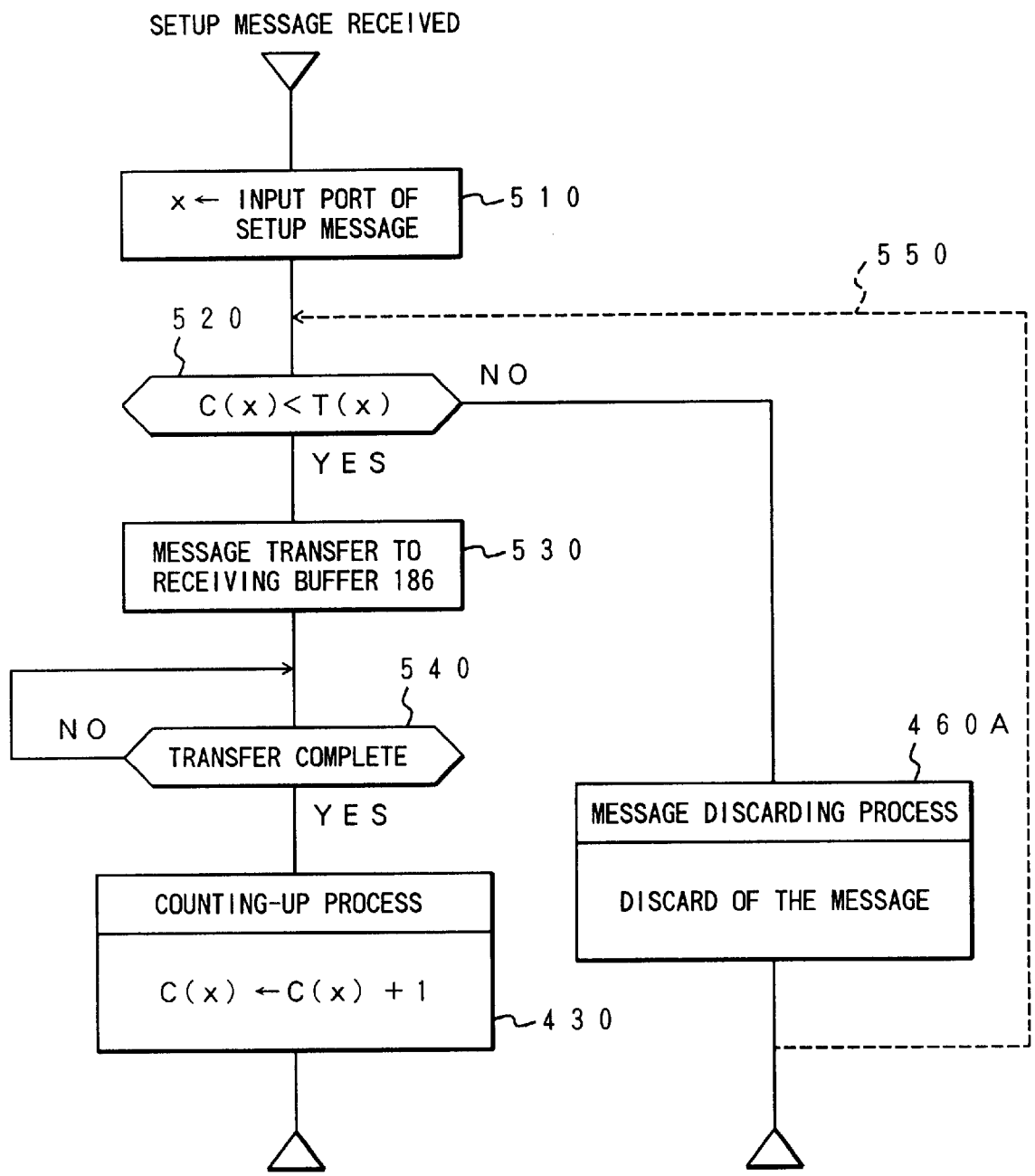
FIG. 5 is a flowchart showing a congestion detecting process.

FIG. 5 shows a flowchart of the congestion detecting process 410 and the counting up process 430 in the message transmitting/receiving process 185.

In the example of FIG. 5, the message transmitting/receiving process 185 extracts the assembled signaling message from the message receiving buffer 184, and checks a value of the input port number of the SETUP message 190 to identify the class x which corresponds to the input port number. In this example, the value of the input port number is set the same as the identification value of the corresponding class. Thus the port number is substituted for x (Step 510), and values of the counter C(x) 446 of the connection number setup table 440 and the connection number T(x) 444 are compared (Step 520). If the value of C(x) 446 is less than the value of T(x) 444, it is judged that congestion is not detected. The message is then transferred to the signaling message receiving buffer 186 (Step 530). When the transfer operation is completed (Step 540), the counting up process is executed by incrementing the value of the counter C(x) by one (Step 430). If the value of C(x) 446 is not less than the value of T(x) 444, it is judged that congestion is detected (Step 520). The message discarding process is then executed to discard the SETUP message (Step 460A).

Figure 6:
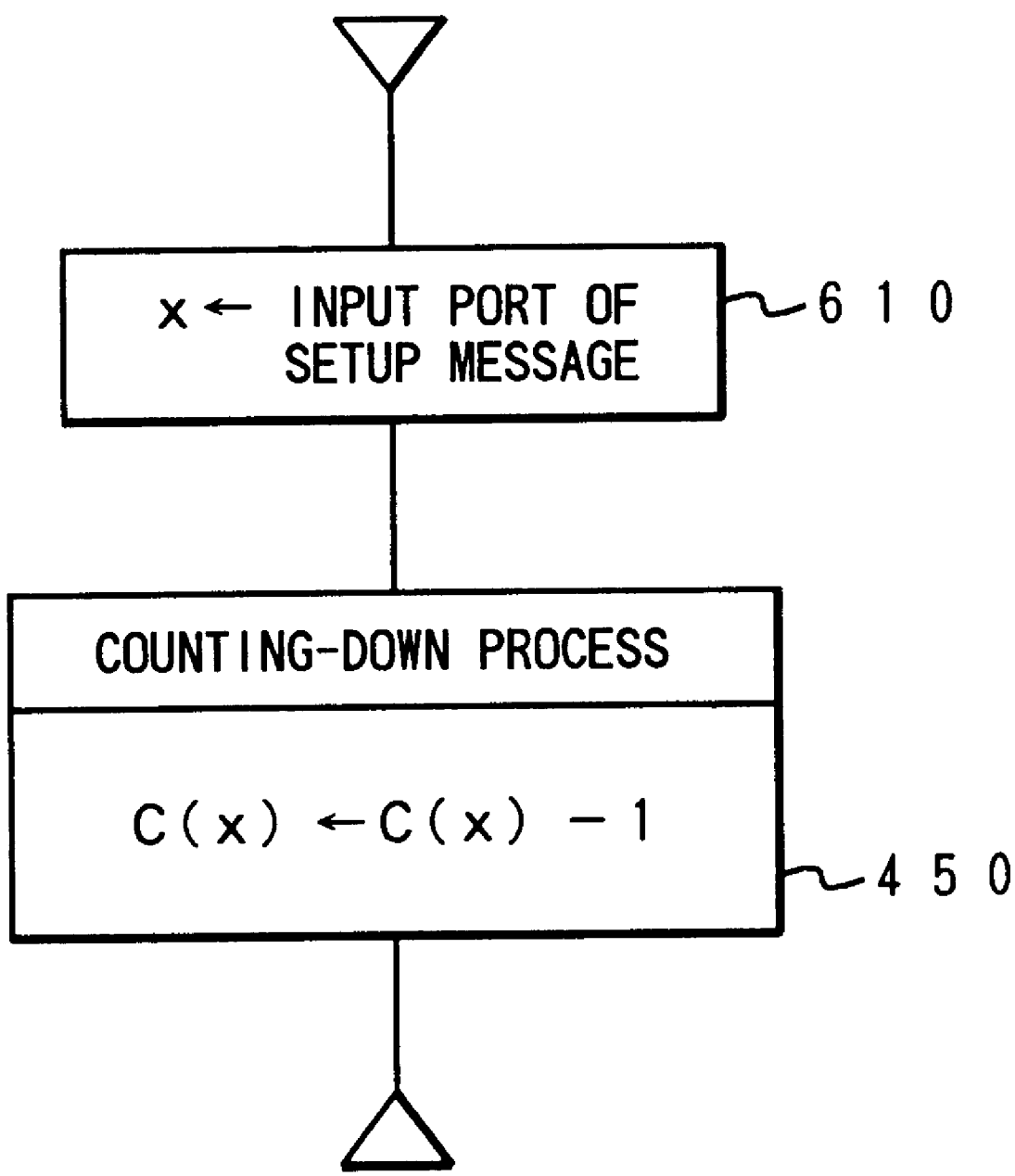
FIG. 6 is a flowchart showing a counting down process.

FIG. 6 shows the counting down process in the signaling message transmitting/receiving process 155. The signaling message transmitting/receiving process 155 extracts the signaling message from the signaling message receiving buffer 186, and at the same time checks the SETUP message for identifying its input port number, and substitutes the identified port number for x (Step 610), and executes the counting down process by decrementing a value of the counter C(x) by one (Step 450).

Because of these processes described above, it is possible to control a number of connections stored in the signaling message receiving buffer 186 at each port, and to thus control the congestion at each port. Even when the congestion occurs due to a large number of connection setup requests from any particular ATM devices, the present invention makes it possible to eliminate the influence of such congestion upon the connection setup requests sent from other ATM devices.

The second embodiment of the present invention will be described with reference to the figures. In the second embodiment, the message discarding process 460B is described using an example in which the messages stored in the signaling message receiving buffer 186 are to be discarded.

Figure 7A:
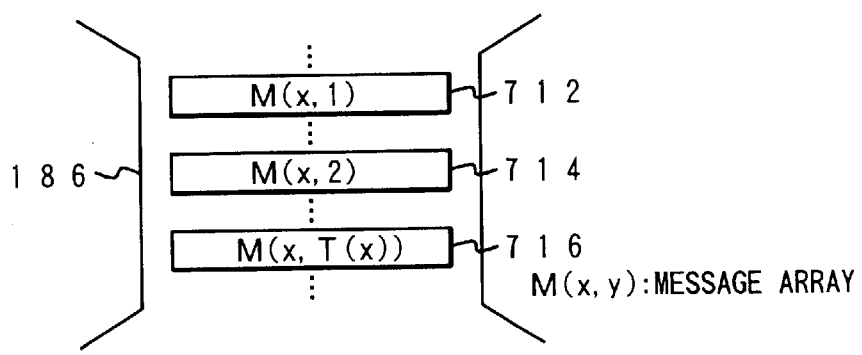
FIG. 7A shows an graphical image of the signaling message receiving buffer while the messages are being stored.
Figure 7B:
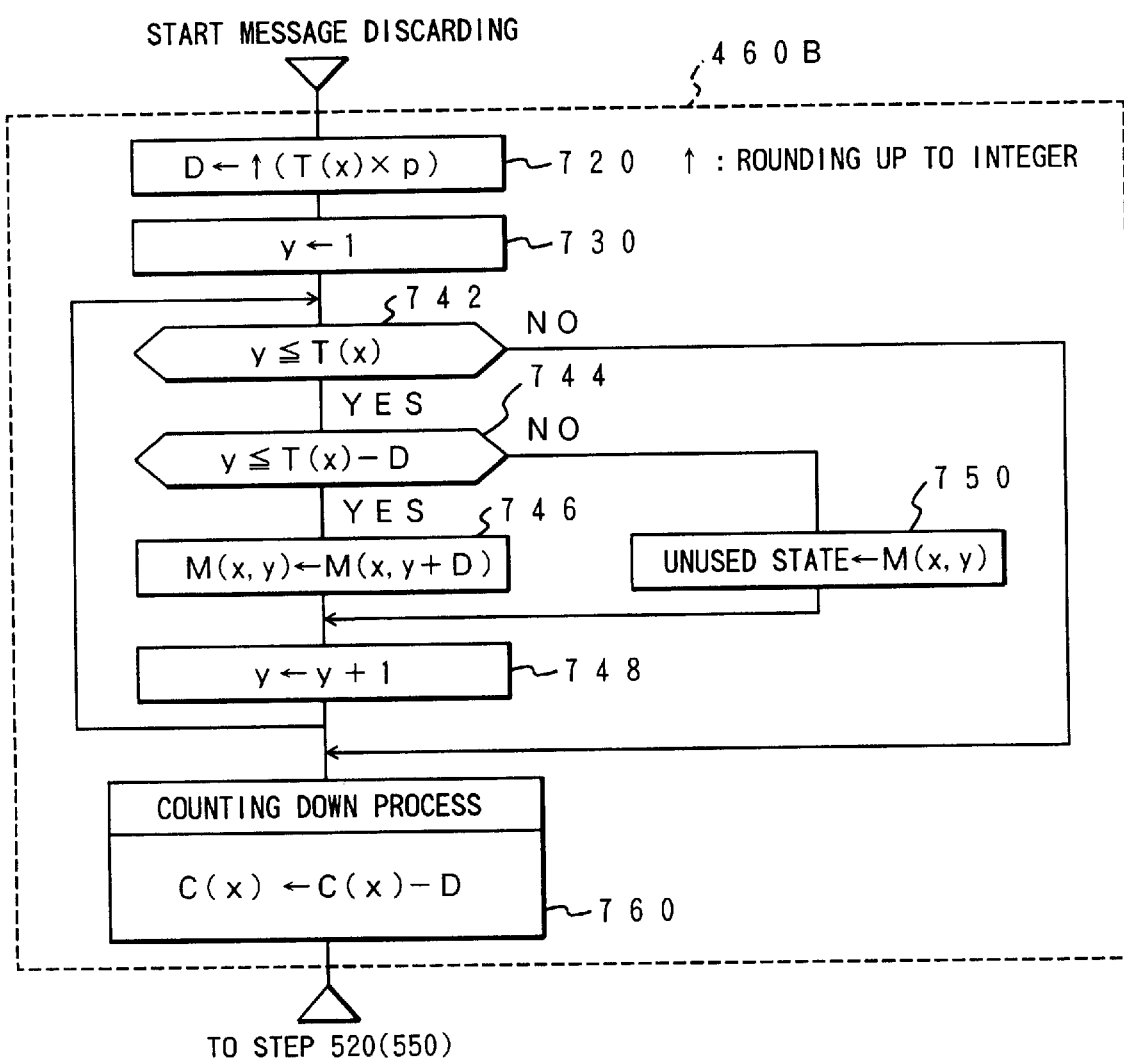
FIG. 7B is a flowchart showing a message discarding process.

FIGS. 7A and 7B show an illustration explaining the signaling message receiving buffer 186 and a flowchart showing the message discarding process 460B. FIG. 7A shows an graphical image of the signaling message receiving buffer 186 with the messages being stored. M(x,y) is a message array, with x, y indicating the class and the storage sequence of the message. The maximum number of messages that may be stored is T(x). The signaling message subjected to the discarding process here is the SETUP message.

An operation of the second embodiment will now be described. In the following section, the operation is described by an example where a rate of discarding messages from the signaling message receiving buffer 186 during congestion is defined as a discarding rate p ($0 \leq p \leq 1$), and an integer value, which is obtained by multiplying the connection number T(x) by the discarding rate p and rounding up the result, is defined as a discarded connection number D.

FIG. 7B shows the message discarding process 460B. As shown in FIG. 7B, the number of older SETUP messages among the messages stored in the signaling message receiving buffer 186, i.e. the SETUP messages stored earlier, that are discarded is as many as a number indicated by the discarding connection number D, and the storing sequence y is reset in the remaining SETUP messages, whose number is the connection number (T(x)–D) indicated.

When the congestion is detected in FIG. 5 (Step 520), as shown in FIG. 7B, the discarding rate p is multiplied by the connection number T(x) of the class x in which the congestion is detected, and the result of multiplication is rounded to an integer value for substituting the discarding connection number D (Step 720). The parameter y indicating the sequence of the message storing is initialized to a value of one (Step 730). The parameter y is incremented by one (Step 748) until it reaches T(x) while following processes (Steps 744, 746, 750) are looped. When a value of the parameter y is not more than the value obtained by subtracting the discarding connection number D from the connection number T(x) (Step 744), the message M(x,y) is reset for M(x, y+D) (Step 746). When a value of the parameter y is more than the value obtained by subtracting the discarding connection number D from the connection number T(x) (Step 744), the message M(x,y) is set to an unused state (Step 750). According to these processes, a plurality of SETUP messages that is as many as a number indicated by the discarding connection number D, starting from the one which arrived the earliest, are discarded from the SETUP messages stored in the signaling message receiving buffer 186.

After discarding the messages, the counter C(x) is decremented by an amount of the discarding connection number D (Step 760) and the process in step 520 shown in FIG. 5 is executed (Step 550). Here, it is now possible for the SETUP message received when the congestion is detected to transfer to the signaling message receiving buffer 186, since the congestion is resolved by the message discarding process 460B.

According to the present embodiment, the SETUP messages stored in the signaling message receiving buffer 186 may be discarded during the congestion. Instead of discarding the SETUP messages that arrived earlier, the other SETUP messages stored in the signaling message receiving buffer 186 may be alternatively discarded.

The third embodiment of the present invention will be explained with reference to the figures. The third embodiment is an example in which a message discard notification process is executed after discarding of the messages in the message discarding process 460.

Figure 8:
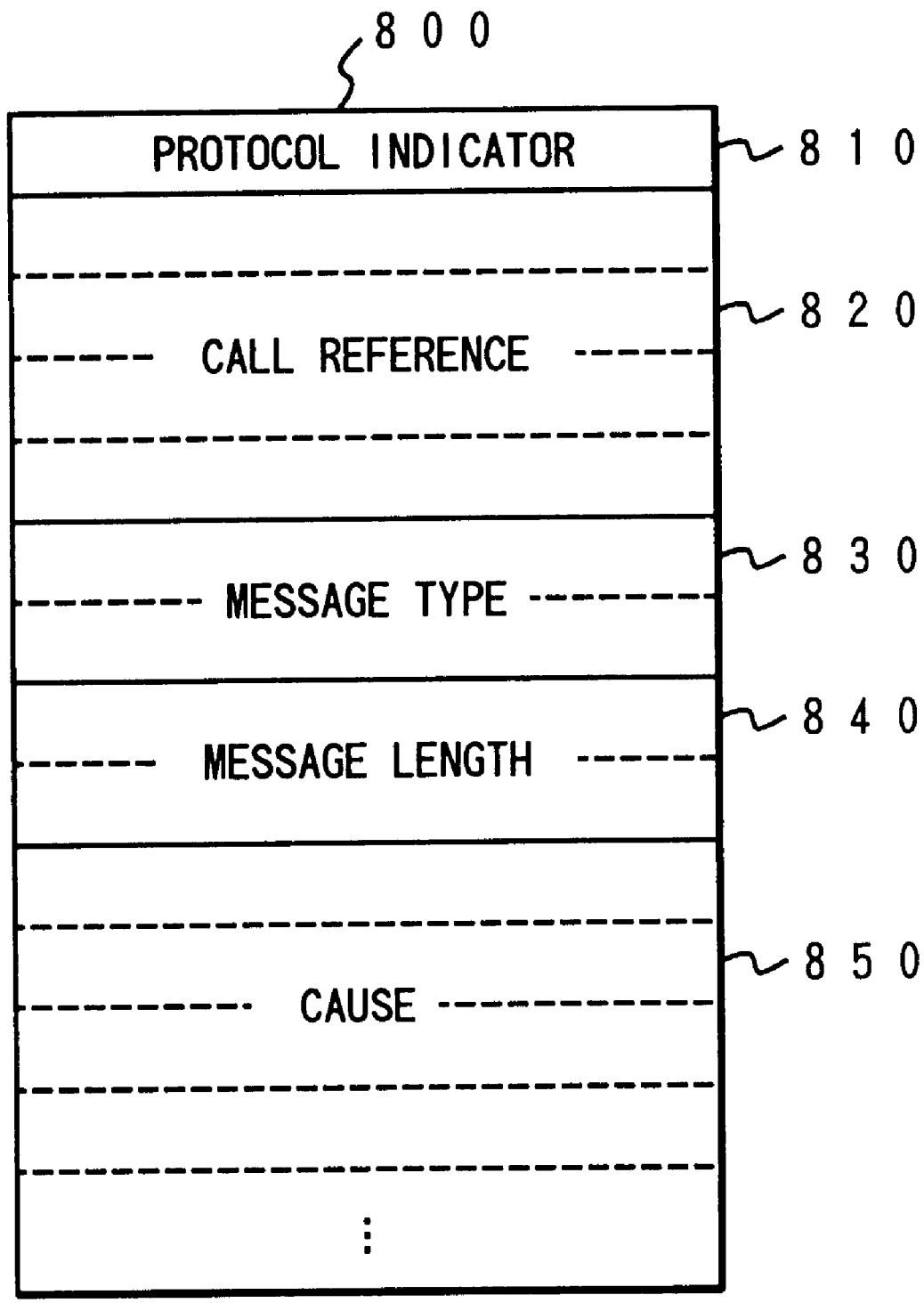
FIG. 8 a schematic illustration showing a RELEASE COMP message format.

FIG. 8 shows a format of a RELEASE COMP message 800, which is an example of the signaling message for executing a message discard notification process. The RELEASE COMP message 800 comprises headers (810–840) common for signaling messages and an information element 850 indicating the cause of discard. The cause of discard may be one of the causes defined in the ATM Forum standard specification, such as cause number 21 "call rejected", cause number 41 "temporary failure", cause number 47 "resource unavailable, unspecified", or cause numbers which are not defined in the standard specification may also be specified.

An operation of the third embodiment will now be described.

Figure 9:
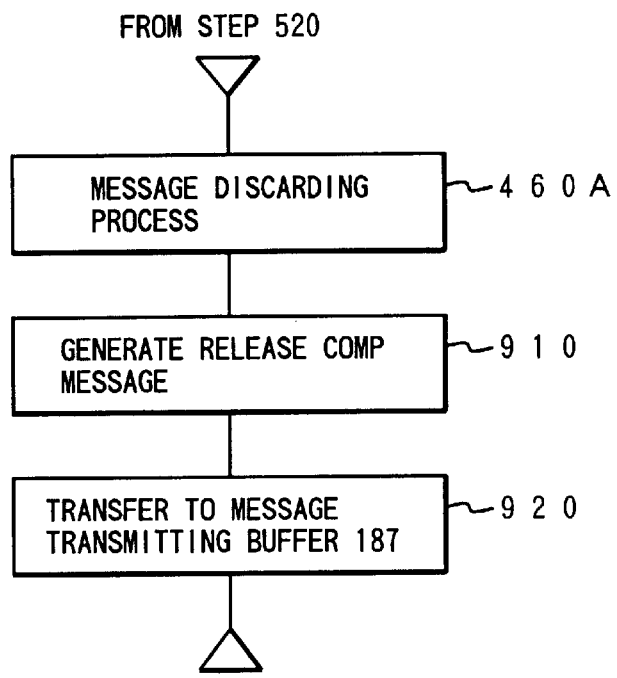
FIG. 9 is a flowchart showing a message discard notification process.

FIG. 9 shows the process in which the message discard notification process is added to the message discarding process 460A. In the process shown in FIG. 9, the RELEASE COMP message 800 is generated (Step 910) after execution of the message discarding process 460A when congestion has been detected in the process in Step 520 shown in FIG. 5. Then the RELEASE COMP message is transferred to the message transmitting buffer 187 shown in FIG. 1 (Step 920), and the RELEASE COMP message 800 is transmitted to the originator of the SETUP message.

Figure 10:
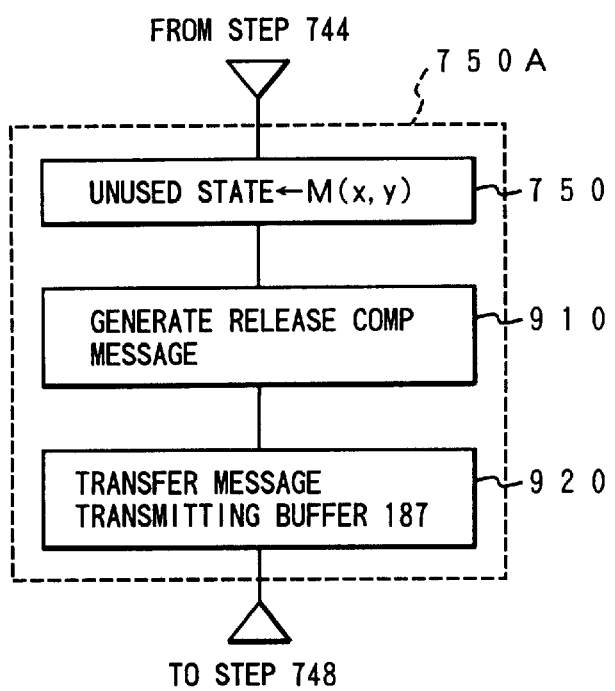
FIG. 10 is a flowchart showing a message discard notification process.

FIG. 10 shows the process in which the message discard notification process is added to the message discarding process 460B of the second embodiment. The RELEASE COMP message 800 is generated in the same way as that of the process shown in FIG. 9 (Step 910) after the process 744 of FIG. 7 and the message discarding process 750, and then the RELEASE COMP message is transferred to the message transmitting buffer 187 of FIG. 1 (Step 920).

According to the present embodiment, it is possible to send notifications of discard of the messages after discarding of the messages by the message discarding process 460, so that the ATM terminals of the originators are able to recognize their discarded messages.

The fourth embodiment of the present invention will be explained with reference to the figures. In the fourth embodiment, a procedure to change the congestion detecting level dynamically during the congestion detecting process is described.

Figure 11:
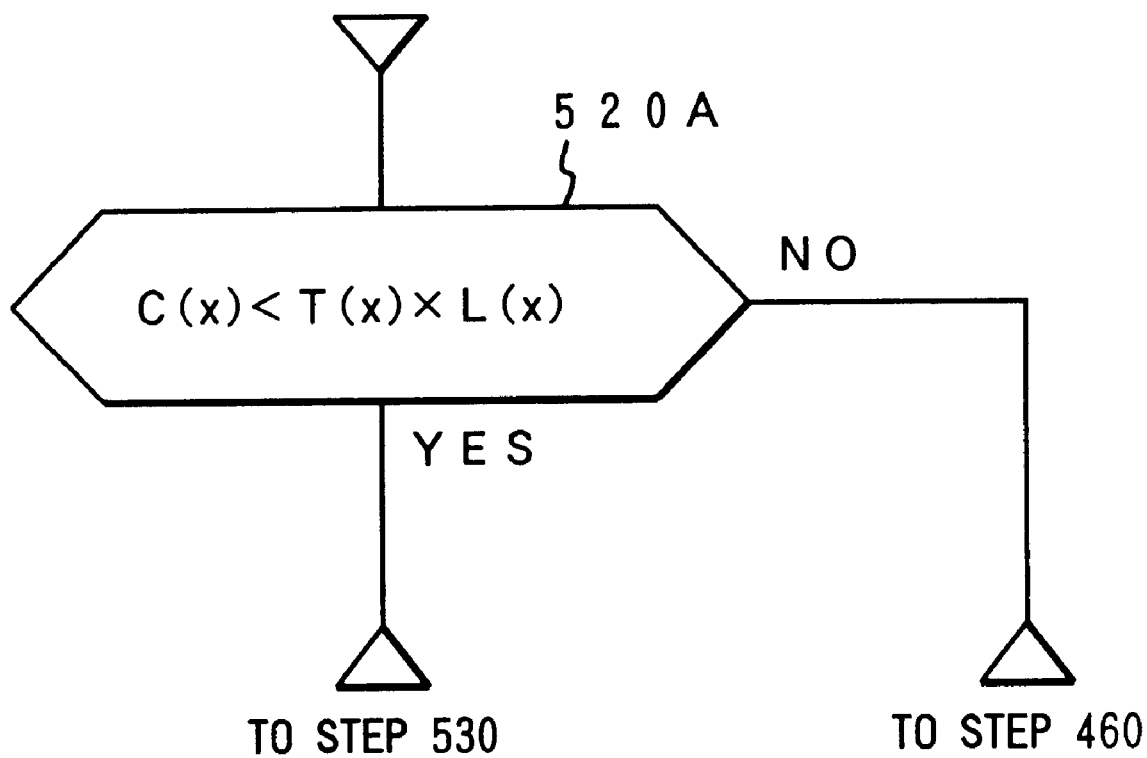
FIG. 11 is a flowchart showing a resetting process of the congestion detection level.

FIG. 11 shows a resetting process of the congestion detecting level. L(x) is a level adjusting parameter which can be preset to a value different for each class within a range of $0 \leq L(x) \leq 1$. In the procedure of step 520 shown in FIG. 5, the connection number T(x) 444 is multiplied by the level adjusting parameter L(x), and the result of multiplication is compared with a value of the counter C(x) 446 (Step 520A).

According to the present embodiment, it is possible to change the congestion detection level. For example, a CPU utilization rate in the signaling process task may be reflected in the level adjusting parameter L(x), or a buffer utilization rate of the shared buffer may be reflected in the level adjusting parameter L(x).

The fifth embodiment of the present invention will be described with reference to the figures. In the fifth embodiment, the connection congestion control method is described for a case where the congestion is classified based on information elements included in the SETUP message.

Figure 12:
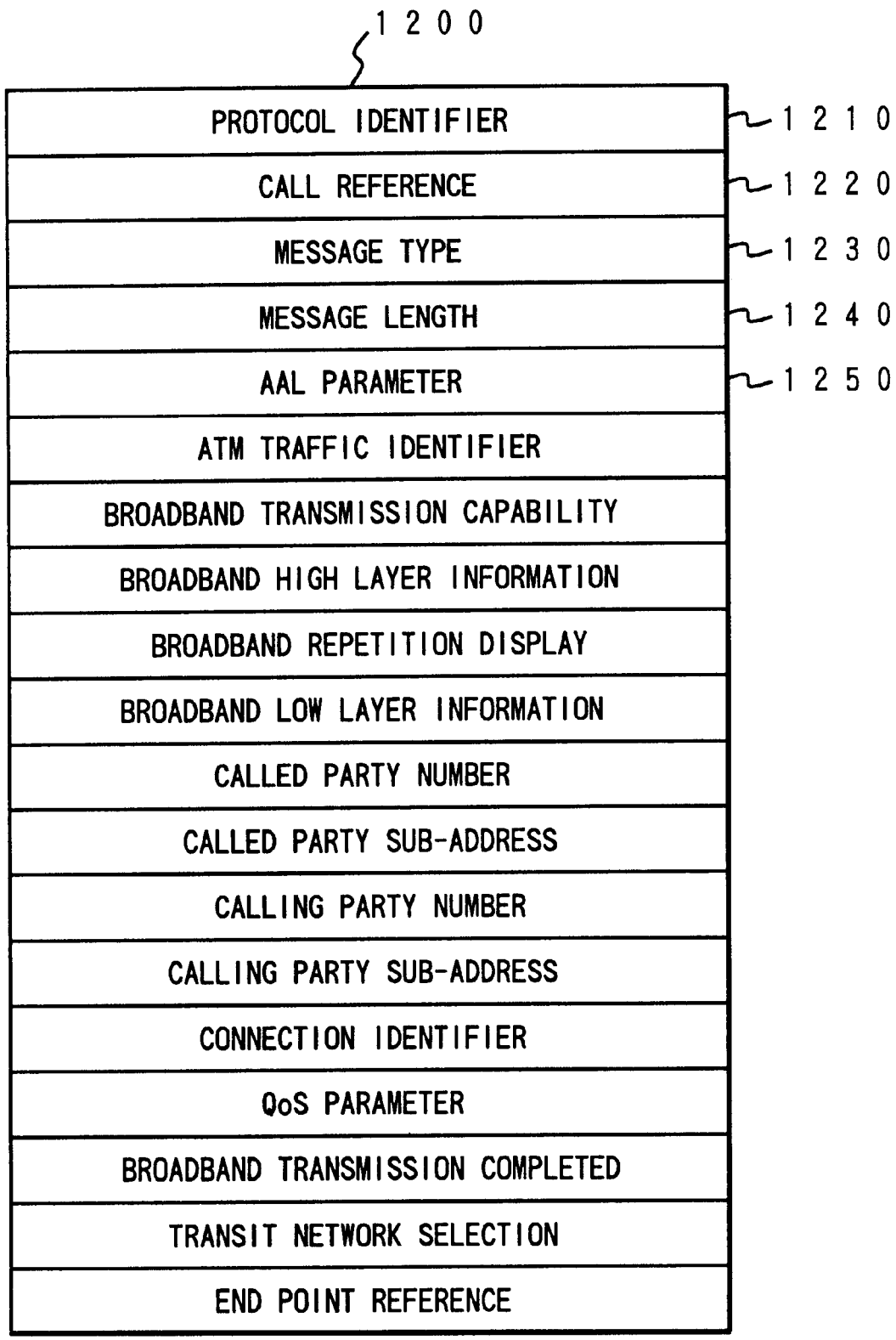
FIG. 12 is a schematic illustration showing a SETUP message format.

FIG. 12 shows a format of the SETUP message 1200. The SETUP message is provided with common headers for the signaling message (1210–1240) and several information elements such as AAL (ATM Adaptation Layer) parameter 1250.

FIG. 13 shows a connection setup table 1300 where the congestion is classified based on the AAL parameter 1250 of the SETUP message 1200. The AAL parameter 1250 specifies an AAL type and one of service types, each suited for communicating different types of information such as voice, data or video. Type 1, Type 2, Type 3/4 and Type 5 are specified as the AAL type by the ATM Forum and IT-U, and these types may be set as the class 1310 as shown in FIG. 13.

An operation of this embodiment is the same as the operation of the message transmitting/receiving process 185 in the first embodiment described above except that it further includes procedures to read out the AAL type from the SETUP message and to determine the class based on the AAL type.

Alternatively, the classification may be carried out based on other information elements included in the SETUP message besides the AAL type.

According to the present embodiment, it is possible to control the congestion in each class by classifying the number of connection setup requests stored in the signaling message receiving buffer 186 based on the contents of the information elements and limiting the number of connection setup requests in each class. According to the present invention, even when the congestion has occurred due to a large number of connection setup requests of the particular class, the connection setup requests of the other classes may remain unaffected by the congestion.

According to the first to fifth embodiments of the present invention, it is possible to control the congestion in each class by classifying the connection setup request based on the port or contents of the information elements of the setup request message. For example, even when a large number of connection setup requests are received in a short period of time due to booting of all ATM devices, or malfunction/failure of ATM devices, or the like, the connection setup requests in the other classes may still be received without being influenced by the congestion.

Embodiments corresponding to the second object of the present invention will now be explained with reference to FIGS. 14 to 25. First, the priority control method for receiving the connection setup requests in the ATM switch is described as the sixth embodiment where the priority of the connection setup request is classified according to port.

Figure 14:
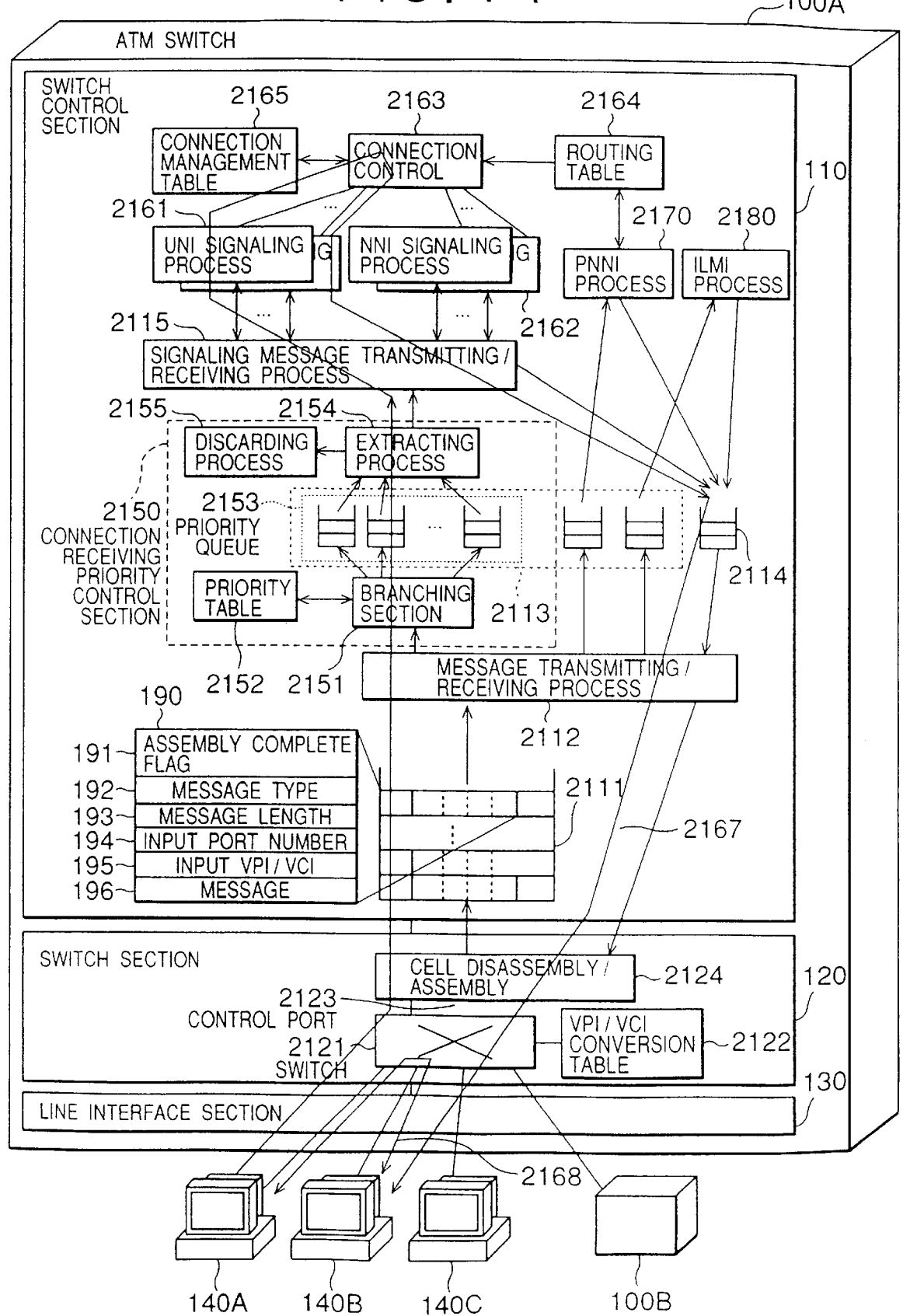
FIG. 14 is a schematic illustration showing a configuration and basic process of the ATM switch.

FIG. 14 shows a configuration of the ATM switch 100A in the sixth embodiment. The ATM switch 100A comprises three major sections, i.e. a switch control section 110 for controlling the switch, a switch section 120 for exchanging cells, and a line interface section 130 which is provided with an ATM interface function. The switch control section 110 has a hardware configuration consisting of elements such as a CPU, a memory, and an interface to the switch section 120. The switch control section 110 of FIG. 1 shows functional blocks of software executed by the CPU and data structures. The line interface section 130 is equipped with a plurality of ports with various physical specifications to connect the ATM terminals 140A, 140B, 140C or the ATM switch 100B respectively. When the ATM terminal 140 is connected the port, the connection specification in between is based on the UNI (User Network Interface). When the ATM switch 100 is connected the port, the connection specification in between is based on the NNI (Network Network Interface). The ATM Forum and ITU-T (International Telecommunication Union-Telecommunication Standardization Sector) are working on standardization of these connection specifications. Each port is also provided with functions of reception means for receiving the connection setup request from the ATM terminal or the ATM switch.

The switch section 120 is provided with a VPI (Virtual Path Identifier)/VCI (Virtual Channel Identifier) conversion table 2122 for converting routing information according to the established destination, a cell disassemble/assemble section 2124 for disassembling and assembling the cell, a switch 2121 for exchanging the connections and a control port 2123 for connecting the switch 2121 and the cell disassemble/assemble section 2124.

The switch control section 110 includes a message receiving buffer 2111 functioning as storage means for storing the signaling message, a message transmitting/receiving process 2112 for transmitting and receiving the messages, a connection receiving priority control section 2150 for carrying out the priority control for receiving the connection setup requests in each class, a signaling message transmitting/receiving process 2115 for transmitting/receiving the signaling message, a UNI signaling process 2161 for executing an signaling process of the UNI, a NNI signaling process 2162 for executing a signaling process of the NNI, a connection control section 2163 for controlling the connections, a routing table 2164 for storing ATM addresses and corresponding connection ports, a PNNI (Private Network Network Interface) process 2170 for setting the routing table 2164, a ILMI (Interim Local Management Interface) process 2180 for setting the ATM addresses to the ATM terminals during the initialization, a connection management table 2165 for being referenced by the connection control section 2163 and a message transmitting buffer 2114 for temporarily storing the message to be transmitted. The UNI signaling process 2161, the NNI signaling process 2162 and the connection control section 2163 are establishment means for establishing the connection.

The connection receiving priority control section 2150 includes a branching process 2151 for checking the priority class of the received messages and branching the message according to its priority class, a priority table 2152 for storing values of the priority classes in correspondence with each of the ports, queues 2153 provided for each priority to store the received messages of corresponding priority class temporarily, an extracting process 2154 for extracting the message according to a algorithm predetermined for extracting the connection setup request, and a discarding process 2155 for discarding the messages during the congestion. The message transmitting/receiving process 2112 detects the message type included in the message, determines the protocol corresponding to the message type, and stores the message in the signaling message receiving buffer corresponding to a process of the determined protocol.

An overview of the procedure is described with reference to FIG. 14 using an example in which the ATM terminal 140A tries to communicate with the ATM terminal 140B using the SVC service. The ATM addresses are assigned to the ATM terminals 140A and 140B by the ILMI process 2180 during the initialization. The routing table 2164, which registers the connecting ports and the corresponding ATM addresses, is generated by the PNNI process 2170.

The ATM terminal 140A transmits the connection setup request message (SETUP message) to the ATM terminal 140B via a signaling channel which is provided for each port. VPI/VCI=0/5 is used as a default value of the standard specification for the signaling channel. The signaling channel is switched to the control port 2123 according to the VPI/VCI conversion table 2122. In the cell disassemble/assemble section 2124, the cell designated to the control port 2123 is stored in the message receiving buffer 2111, and a plurality of the cells designated for each destination are assembled into single frame formation to construct a service data unit. Further, the cell disassemble/assemble section 2124 adds the input port number of the port to which the message was inputted to a field of the input port number 194 in a message 190. The input port number of the port to which the message is inputted is given by the switch 2121. Since the message receiving buffer 2111 is used for disassembling and assembling of the cell, it is provided with ample capacity to store a plurality of the service data units. In the message receiving buffer 2111, there are messages that have completed being assembled and uncompleted messages. The message 190 in the message receiving buffer 2111 is stored with such information indicated by numerals 191 to 196 as shown in FIG. 14. In the cell disassemble/assemble section 2124, an assembly complete flag 191 is set for the message which has completed being assembled. The message transmitting/receiving process 2112 checks if assembling of the message has been completed or not by detecting the assembly complete flag 191 of the message stored in the message receiving buffer 2111, then detects the message type 192 of the message which has completed being assembled, and transfers the message to the signaling message receiving buffer 2113 of the protocol process corresponding to the detected message type. The signaling message transmitting/receiving process 2115 extracts the message from the signaling message receiving buffer 2113, and sends the message to the UNI signaling process 2161 or the NNI signaling process 2162. These processes are provided for every one of the ports. As a result of the process described above, the SETUP message from the ATM terminal 140A is forwarded to the UNI signaling process 2161. The connection control section 2163 identifies the UNI signaling process 2161 of the ATM terminal 140B, the calling party, with reference to the routing table 2164. Further, checking operations are executed to see, for example, whether or not the necessary resources are available to establish a new connection using the connection management table 2165. If the necessary resources are available, the SETUP message is transmitted from the ATM switch 100 to the ATM terminal 140B. According to the series of processes 2167, the connection 2168 may be established for communications between the ATM terminal 140A and the ATM terminal 140B.

An operation of the connection receiving priority control section in the sixth embodiment will be described. The operation is illustrated by an example of the ATM switch 100 with eight ports which being divided into four classes. A value of the class corresponding to the every port is defined in a priority table 2200 (2152) in advance.

FIG. 15 shows the priority table 2200 (2152). The priority table 2200 has a plurality of entry sets, which are provided in correspondence with a respective one of the priority classes, each entry set comprising the priority class 2210 and the port 2220. The port 2220 may be specified in advance by a system supervisor. In the following, the priority is assumed to be higher for a smaller value of priority. In this example, a device type 2230 is provided as information and it is not required for an actual table. In the example shown in FIG. 15, the port 0 is connected to an ATM switch, the ports 1 and 2 are connected to routers or LAN servers such as ATM ARP servers, or LAN emulation servers, the ports 3 and 4 are connected to server terminals such as file servers or printer servers, and the ports 5 to 7 are connected to general terminals.

Figure 16:
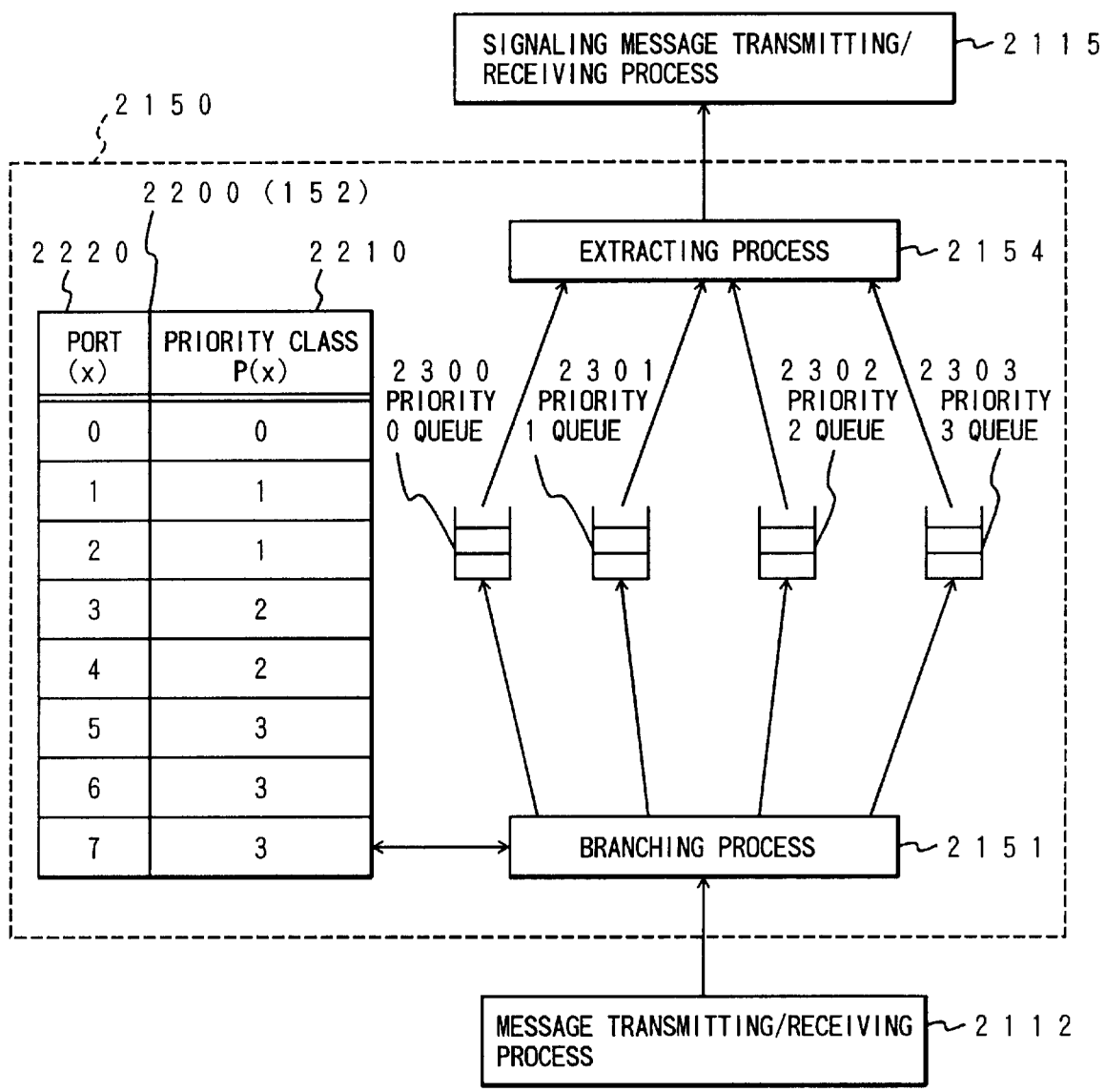
FIG. 16 is a schematic illustration showing a principle of the priority control method for receiving connection setup requests.

FIG. 16 shows a configuration of the connection receiving priority control process in the sixth embodiment. The priority control process for receiving connection in the present embodiment is executed in the connection receiving priority control section 2150 of FIG. 14. Once the message 190, which is constructed by adding a header specifying information 191 to 196 to the signaling message, is received from the message transmitting/receiving buffer 2112, the branching process 2151 extracts the input port number 194 of the signaling message. Then the branching process 2152 stores the signaling message in the queue of the priority class which corresponds to the extracted input port number 194 while referencing the priority table 2200. The priority table 2200 shown in FIG. 15 may be alternatively constructed like the table shown in FIG. 16, which comprises a plurality of entry sets, each comprising the port x and the priority class P(x). The extracting process 2154 extracts the signaling message from each of the priority queues comprising the priority 0 queue 2300 to the priority 3 queue 2303 by using a predetermined algorithm (hereafter, it is called a priority algorithm) for extracting the connection setup request based on the priority class, and transfers the signaling message to the signaling message transmitting/receiving process 2115.

Figure 17:
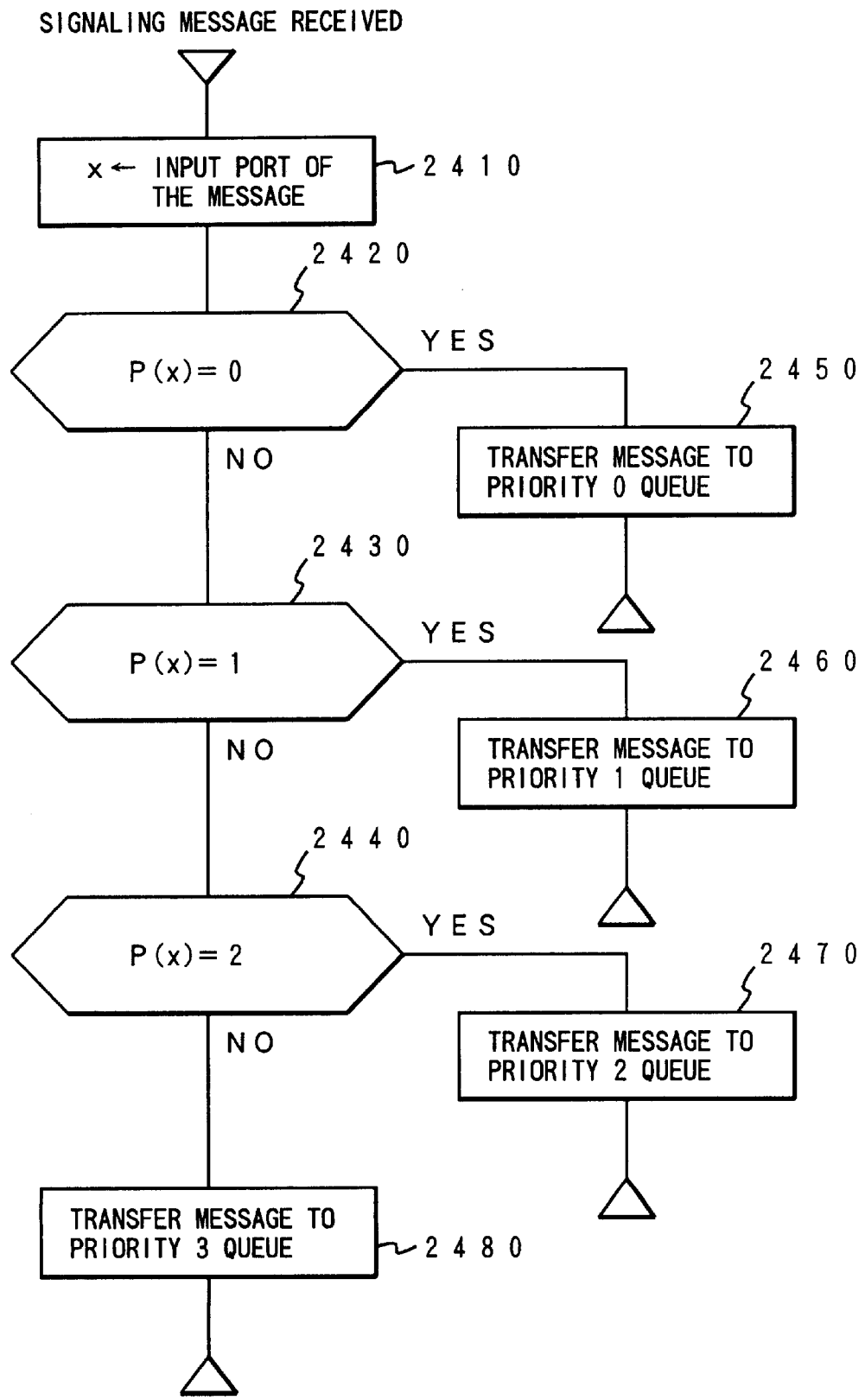
FIG. 17 is a flowchart showing a branching process.

FIG. 17 is a flowchart showing the branching process executed in the connection receiving priority control section 2150.

As shown in FIG. 17, when the assembled signaling message is received from the message transmitting/receiving process 2112, the branching process 2151 identifies an input port number by checking the input port number 194 of the message 190 and substitutes the input port number for x (Step 2410). If the priority class P(x) of the priority table 2200 is 0 (Step 2420), the signaling message is transferred to the priority 0 queue 2300 (Step 2450). If the P(x) is 1 (Step 2430), the signaling message is transferred to the priority 1 queue 2301 (Step 2460). If the P(x) is 2 (Step 2440), the signaling message is transferred to the priority 2 queue 2302 (Step 2470). If the P(x) is not equal to 0, 1 or 2 (Step 2440), the signaling message is transferred to the priority 3 queue 2303 (Step 2480). These processes are carried out when the signaling message is received.

Figure 18:
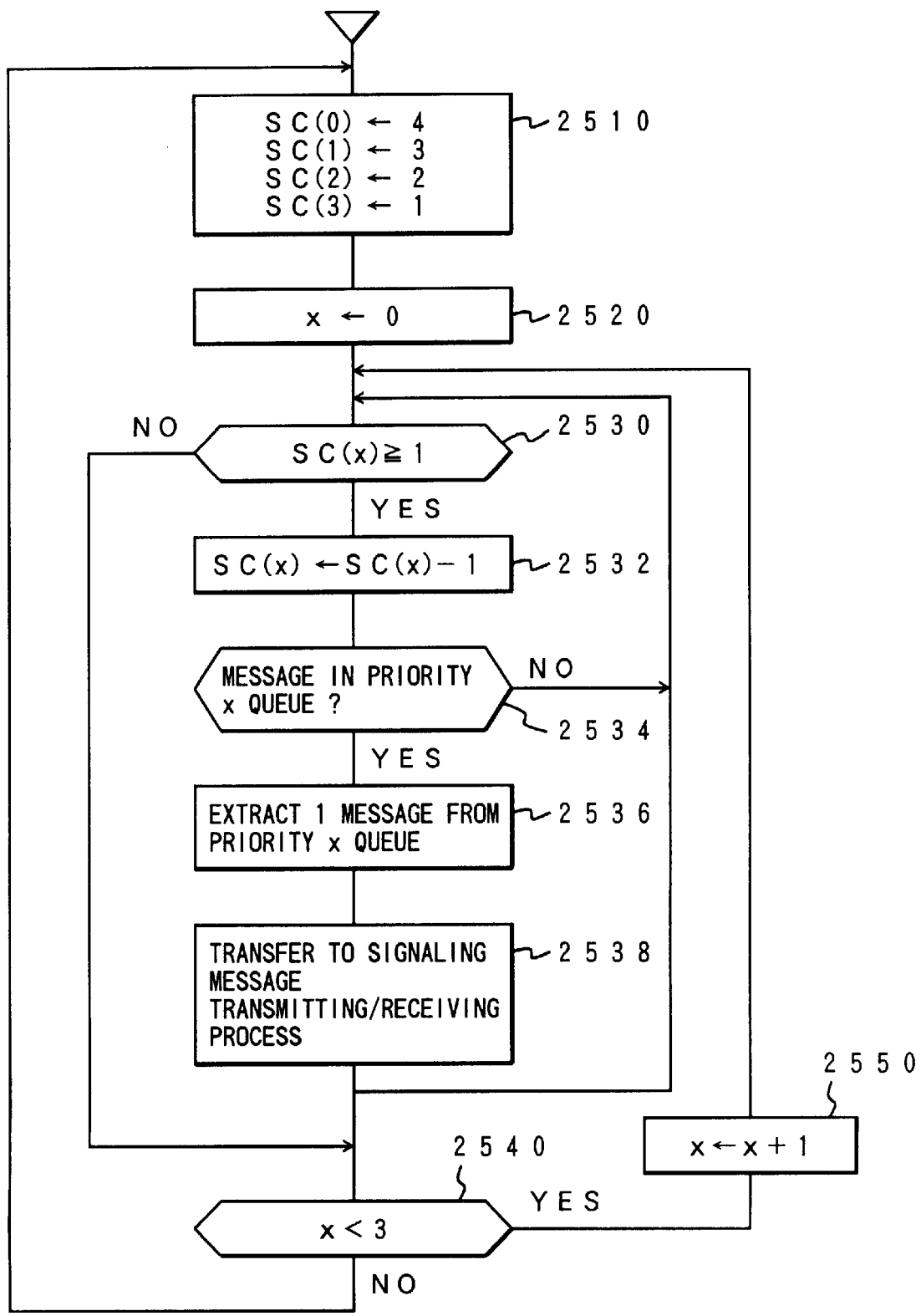
FIG. 18 is a flowchart showing an extracting process.

FIG. 18 shows a flowchart showing the extracting process executed in the connection receiving priority control section 2150.

A suitable priority algorithm shall be implemented in extracting the signaling message from each of the priority queues 2300 to 2303. If the algorithm is strictly based on the priority, the processing of signaling messages in the priority queue having a lower priority may rarely be executed, and "sinking" of the process may occur. Therefore the priority algorithm shown by the flowchart in FIG. 18 is defined a priority algorithm in which a value is set for each of the priority queues to define the minimum repetition number of a process, which is repeated with a constant frequency within the process to check the priority queue to see if there are any signaling messages stored, so as to prevent such sinking of signaling message processing in the lower priority queue. The repetition number of the checking process (the repetition number of the extracting process if the signaling messages are still stored) may be set for each of the priority classes. For example, the repetition number may be set as four times for the priority 0, three times for the priority 1, twice for the priority 2, and once for the priority 3.

As shown in FIG. 18, initial values of the parameters are set (Step 2510) while the priority class is defined as the parameter x and the minimum repetition number of the checking process, which checks the priority queues 2300 to 2303 to see if there are any signaling messages left, is defined as the parameter SC(x). In this example, the initial value of the parameter x is set to 0 so as to execute extraction from the priority queue with higher priority (Step 2520). The priority 0 queue 2300 is checked and if the parameter SC(0) is not less than 1 (Step 2530), the parameter SC(x) is decremented by 1 (Step 2532). The priority 0 queue is then checked to see if there are any signaling messages left (Step 2534). If the signaling messages exist, the first signaling message in the priority 0 queue, which was stored at the earliest time, is extracted (Step 2536) and transferred to the signaling message transmitting/receiving process 2115 (Step 2538). If there is no signaling message left (Step 2534), the processes following step 2530 are repeated. If the SC(0) is less than 1 (Step 2530), the extraction process of the priority 0 queue ends for this period of time. If the parameter x is less than 3 (Step 2540), the parameter x is added by 1 (Step 2550). By incrementing the value of the parameter x by one, the same processes mentioned above (Steps 2530 to 2538) are repeated for each of the priority 0 queue 2300 to the priority 3 queue 2303. When the checking of the priority 0 queue 2300 to the priority 3 queue 2303 is completed and the parameter x becomes not less than 3 (Step 2540), it returns to the initialization process of the parameter SC(x) and the parameter x (Steps 2510, 2520) so as to repeat these processes.

According to the present embodiment, the connection setup request may be received in the ATM switch based on the priority which is assigned in correspondence with a level of importance of the ATM device connected to the port of the ATM switch. Here, the signaling message described above may be any one of the signaling messages, such as the SETUP message. Alternatively, it is possible to store only the SETUP messages in the priority queues while providing new queues besides the priority queues to store the other types of signaling messages. To prevent congestion due to the overflow of each queue, the discarding process 2155 shown in FIG. 14 may be executed when a number of signaling messages stored in each queue reaches a predetermined number of the signaling messages so as to discard the signaling messages after a certain number of signaling messages are extracted by the extracting process 2154. When the signaling messages are discarded, the discarding process 2155 may also send a message for notifying discard of the connection setup request to an originator of the discarded connection setup request.

The seventh embodiment of the present invention will be described with reference to the figures. In the seventh embodiment, the priority control method for receiving the connection setup request will be described in such a case that the connection setup request is classified based on information parameters included in the SETUP message. The information element is an element constructing the signaling message or the like, and includes a plurality of parameters. The seventh embodiment has the same structure as that of the sixth embodiment except for the content of the priority table and the branching process. These points of difference are described in the following part.

Figure 19:
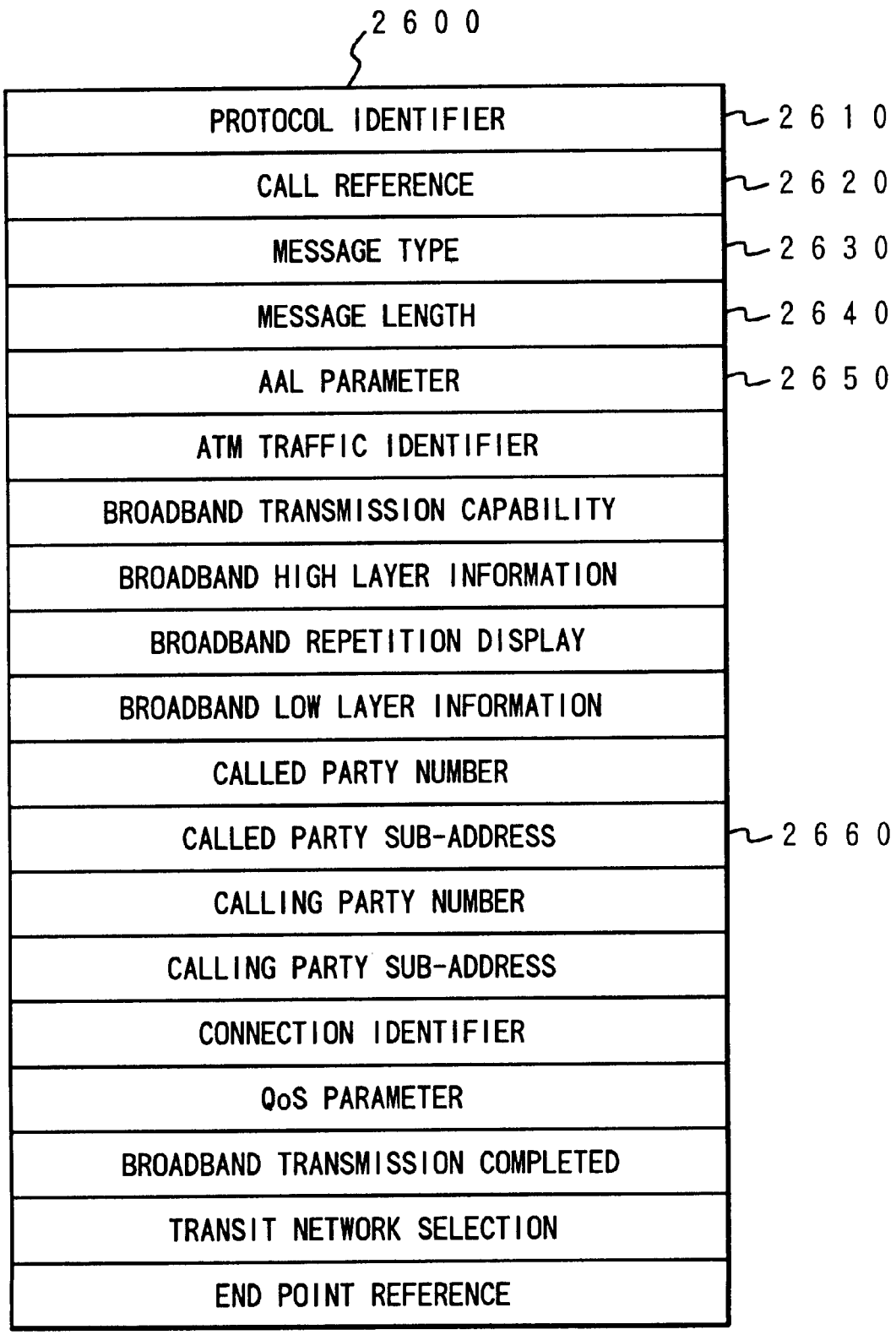
FIG. 19 is a schematic illustration showing a SETUP message format.

FIG. 19 shows a format of the SETUP message 2600 according to the UNI version 3.1 of ATM Forum. The SETUP message 2600 is provided with common headers among the signaling messages (2610–2640) and several information elements such as an AAL (ATM Adaptation Layer) parameter 2650. In the following, an operation is described when the priority is divided into four priority classes based on the AAL parameter.

The AAL parameter 2650 specifies an AAL type and one of the service types, each suited for communicating different types of information such as voice, data or video. Type 1, Type 3/4 and Type 5 are specified as the AAL type by the ATM Forum. This information element is defined as optional. In the present embodiment, the priority class is set for each of the AAL type.

FIG. 20 shows the priority table 2700. The priority table 2700 has a plurality of entry sets provided in correspondence with a respective one of the priority classes, each entry set comprising the class 2710 and the AAL type 2720. The AAL type may be classified in advance by the system supervisor. In this example, a service content 2730 of the AAL type is provided as information and it is not required for an actual table. In the example shown in FIG. 20, the service content of the AAL type 1 is for voice and video, the service content of the AAL type 3/4 is for the connection-type data, the service content of the AAL type 5 is for the connectionless-type data.

Figure 21:
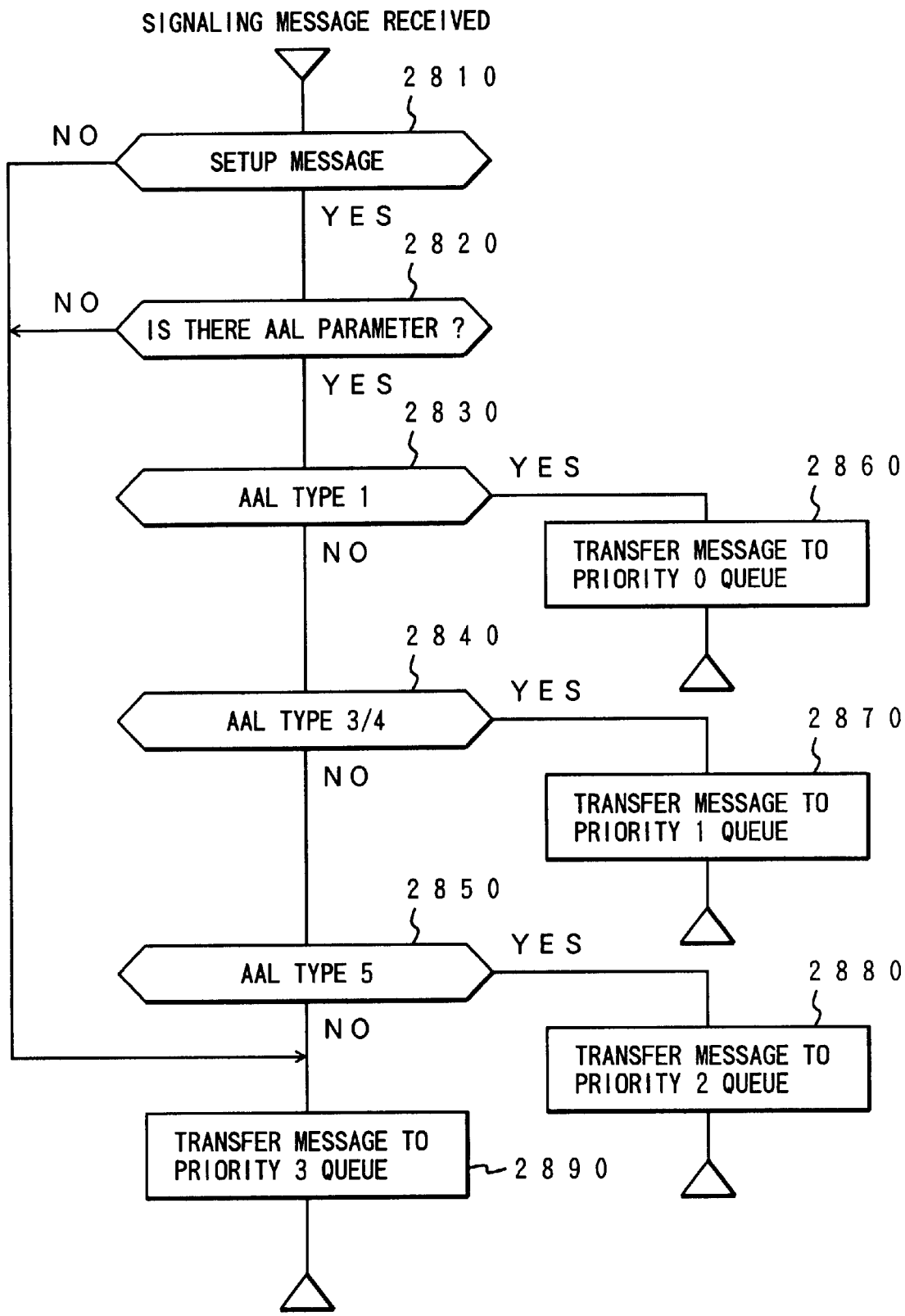
FIG. 21 is a flowchart showing a branching process.

FIG. 21 shows a flowchart illustrating the branching process of the connection receiving priority control section 2150 of the seventh embodiment.

As shown in FIG. 21, when the signaling message that has completed being assembled is received, the branching process 2151 checks if it is the SETUP message or not (Step 2810). If it is the SETUP message, the branching process 2151 further checks if the AAL parameter is available (Step 2820), and identifies the AAL type if the AAL parameter is available. If the AAL type is 1 (Step 2830), the SETUP message is transferred to the priority 0 queue 2300 (Step 2860). If the AAL type is 3/4 (Step 2840), the SETUP message is transferred to the priority 1 queue 2301 (Step 2870). If the AAL type is 5 (Step 2850), the SETUP message is transferred to the priority 2 queue 2302 (Step 2880). If the AAL type is different from any of the above, or is not available (Step 2820) and if the message received is not the SETUP message, the message is transferred to the priority 3 queue (Step 2890).

The extracting process of the connection receiving priority control section 2150 may be executed in the same way as the process shown in the flowchart in FIG. 18, or based on a different priority algorithm.

According to the present process, the connection setup request may be received according to the priority which is assigned in correspondence with a level of importance of the information element parameter included in the connection setup request.

The eighth embodiment of the present invention will be described with reference to the figures. In the eighth embodiment, a method is described in which a discarding priority is additionally defined so as to specify the sequence of discarding the connection setup requests for each of the priority queues, which store the classified connection setup requests and are described in the sixth and seventh embodiments, and the connection setup requests are preferentially discarded from the priority queue of the higher discarding priority if a total number of messages stored in the priority queues exceeds a predetermined value.

FIG. 22A shows the discarding priority table 2900, and FIG. 22B shows the discarding priority table 2920.

The discarding priority table 2900 of FIG. 22A is configured so as to include an additional discarding priority item in the entry of the discarding priority table 2200 shown in FIG. 15. Values of the discarding priority in this table are set to NONE at the priority queues with the priority class value of 0 to 2 since no message is discarded in these priority queues, and set to 0 at the priority queue with the priority class value of 3 to assign the highest discarding priority. The discarding priority table 2920 of FIG. 22B is configured so as to include an additional discarding priority item in the entry of the discarding priority table 2700 shown in FIG. 20. Values of the discarding priority in this table are set to NONE at the priority queue with the priority class value of 0 since no message is discarded in this priority queue, and respectively set to 2, 1, and 0 at the priority queues with the priority class values of 1, 2, 3 to assign a higher discarding priority to the priority queue with a lower priority.

Figure 23A:
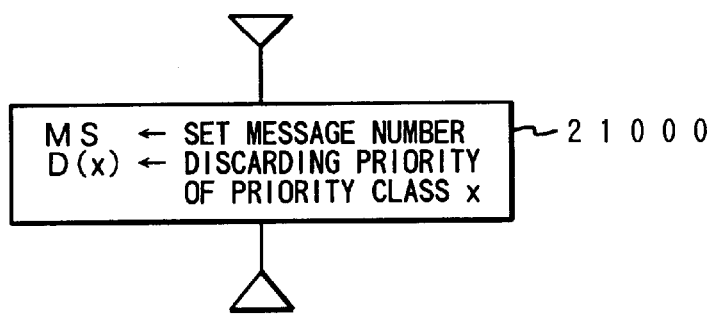
FIG. 23A is a flowchart showing an initialization step of the discarding process.
Figure 23B:
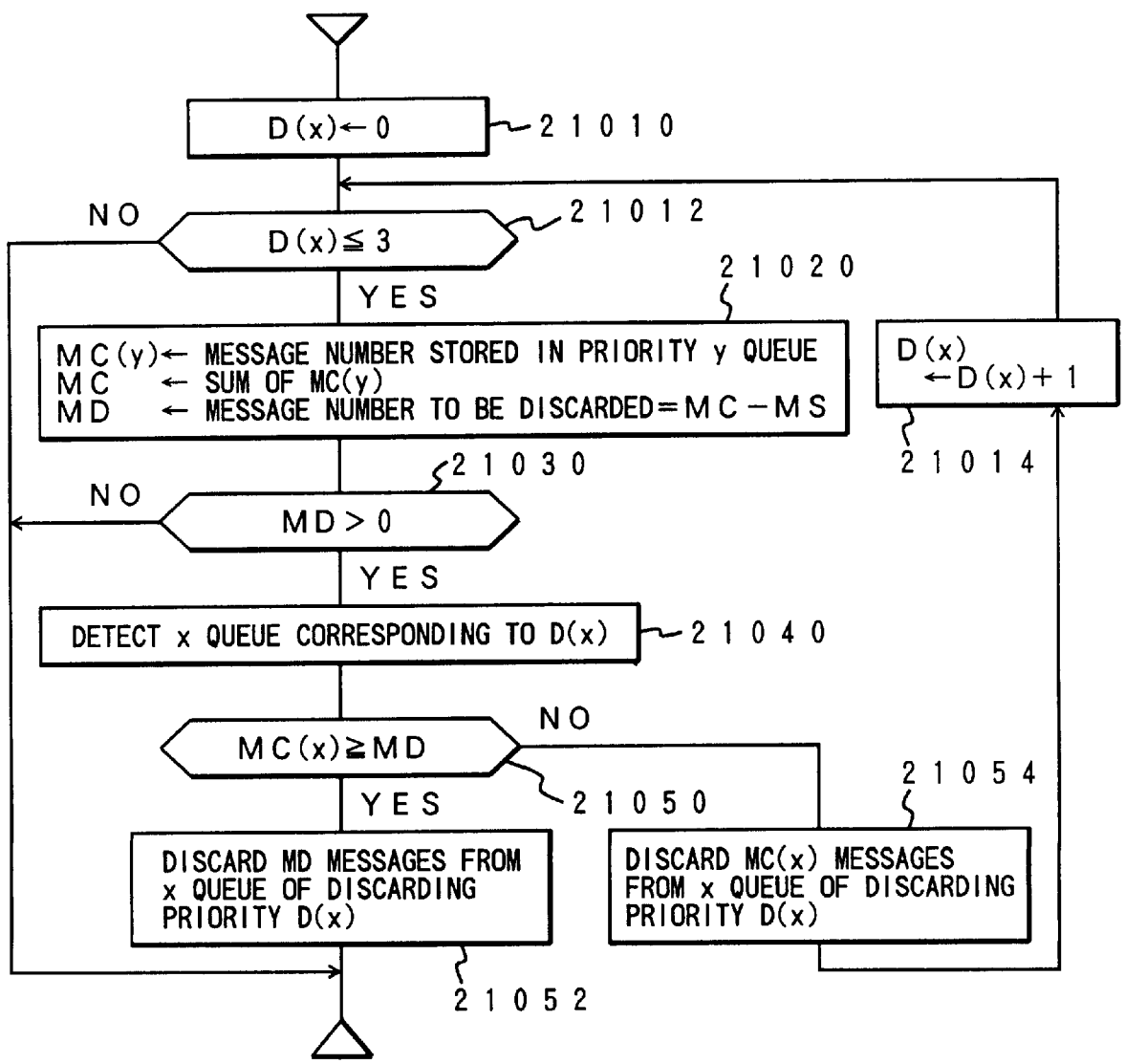
FIG. 23B is a flowchart showing a discarding process.

FIGS. 23A, 23B are flowcharts showing the discarding process.

In the initialization process shown in FIG. 23A, a predetermined value for a total number of messages to be stored in all of the priority queues is substituted for MS, and a predetermined value of the discarding priority is substituted for D(x) which is defined as the discarding priority of the priority class x (Step 21010). D(3)=0, D(0), D(1), D(2)= NONE if the discarding priority table 2900 is referenced, or D(3)=0, D(2)=1, D(1)=2, D(0)=NONE if the discarding priority table 2920 is referenced.

The discarding process of FIG. 23B, which is shown as the discarding process 2155 in FIG. 14, is assumed to be executed following step 2540 of the extracting process shown in FIG. 18 if the judgment at step 2540 becomes NO. D(x) is set to 0 so that the discarding process may be executed starting from the priority queue with higher discarding priority D(x), i.e. D(x)=0 (Step 21010). In this example, a value of the discarding priority is assumed to be 0 to 3 or NONE, and the discarding process is not executed for the discarding priority of NONE. Therefore, a value of the discarding priority is checked to see if the value exists within a range of the discarding priority value, i.e. from 0 to 3 (Step 21012). Then, a number of messages stored in each of the priority queues is detected, and the detected numbers are substituted for MC(0)–MC(3) respectively. A result of MC(0)+MC(1)+MC(2)+MC(3) is substituted for MC which is defined as a total number of messages stored in all of the priority queues. A number of messages to be discarded is defined as MD, and MD is calculated by subtracting MS from MC (Step 21020).

If MD is larger than 0, i.e. if there is at least one message to be discarded (Step 21030), the queue of the priority class x, which corresponds to the discarding priority D(x), is detected (Step 21040). If MD is 0 or less, i.e. if there is no message to be discarded, the process is ended.

If the message number MC(x) of the priority x queue is equal to MD or larger (Step 21050), MD messages are discarded from the queue of the priority class x corresponding to the discarding priority D(x) (Step 21052), and the process is then ended.

If the message number MC(x) of the priority x queue is less than the discarding message number MD (Step 21050), all of the messages stored in the priority x queue, i.e. MC(x) messages, are discarded (Step 21054). The value of D(x) is then incremented to check the higher discarding priority (Step 21014). A series of processes from the step 21020 to the step 21054 is repeated within a range of the discarding priority (Step 21012).

For example, the discarding process is described in such a case that ten messages are stored in each priority queue, and MC(0)=10, MC(1)=10, MC(2)=10, MC(3)=10, and the predetermined value MS, the total number of messages for all of the priority queues, is set to 25. When the discarding priority table 2900 is referenced, ten messages are discarded from the priority 3 queue which corresponds to D(x)=0 by the single cycle of execution of this message discarding process. When the discarding priority table 2920 is referenced, ten messages are discarded from the priority 3 queue corresponding to D(x)=0 and five messages are discarded from the priority 2 queue corresponding to D(x)=1 by the single cycle of execution of this message discarding process.

According to the present embodiment, the overflow of the priority queue may be prevented even when unprocessed connection setup requests are accumulated in a particular queue and the number of connection setup requests stored in this queue becomes equal to a predetermined number or larger. This is accomplished by assigning the discarding priority in advance to define the sequence of discarding the connection setup requests for each of the queues, then extracting the connection setup requests from the queue in which the connection setup requests are stored, and discarding the extracted connection setup requests according to a predetermined algorithm for discarding the connection setup requests based on the discarding priority.

The ninth embodiment of the present invention is described with reference to the figures. In the ninth embodiment, a message discard notification process is added after discard of the messages in the discarding process described in the eighth embodiment.

In the message discard notification process executed by the discarding process 2155 shown in FIG. 14, a message discard notification operation using a RELEASE COMP message, which is one of the signaling messages, is executed after discard of the messages in the discarding process shown in FIGS. 23A, 23B, i.e. after step 21052 or 21054. The RELEASE COMP message may additionally include, following the header section, a message type specifying the message discard notification, identity information of the discarded SETUP message, and information indicating one of predetermined discarding causes.

According to the present embodiment, it is possible to execute the message discard notification operation after discarding of the messages in the discarding process 2155 shown in FIG. 14, and let the ATM terminal of the originator know of unsuccessful reception of the connection.

The tenth embodiment of the present invention will be described with reference to the figures. In the tenth embodiment, the connection receiving priority control method is described for such a case that the priority is given to the connection setup request which is sent from the other ATM switch and relayed through by more ATM switches during the reception of the connection setup requests.

Figures 24, 25:
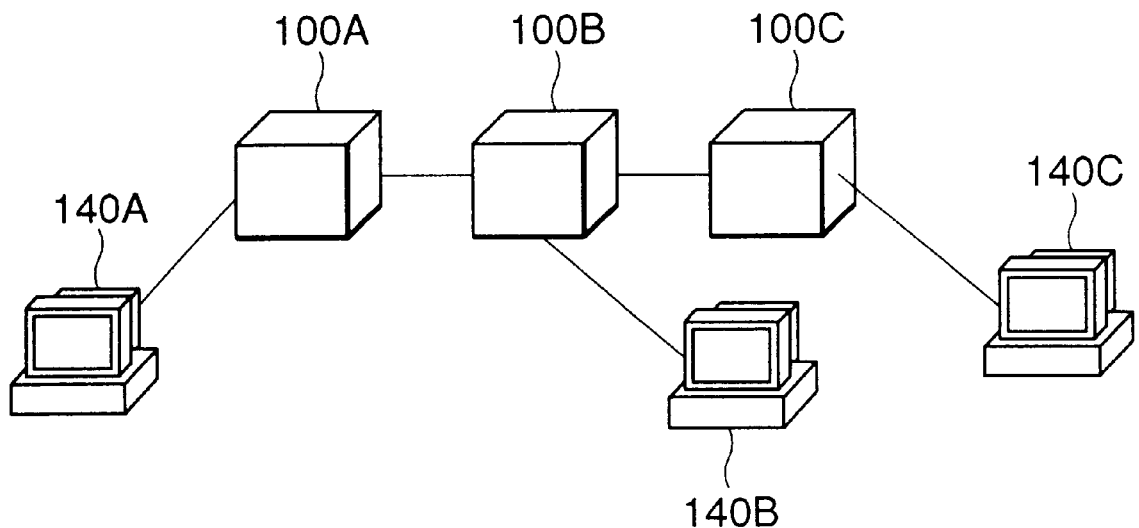
FIG. 24 is a schematic illustration of an ATMLAN system.
FIG. 25 is a schematic illustration of a HOP number table.

FIG. 24 shows an example of an ATM-LAN system configuration where ATM switches 100A–100C and ATM terminals 140A–140C are connected. The present embodiment is described using an example where the connection receiving priority control is executed at the ATM switch 100A.

The ATM switch receives the SETUP message from the ATM switch 100B when either calling party at the ATM terminal 140B or at the ATM terminal 140C tries to establish communications with the ATM terminal 140A. According to the sixth embodiment, the SETUP messages sent from the ATM terminals 140B and 140C will be stored in the same priority queue since the priority is defined by the port to which the ATM switch 100B is connected in the sixth embodiment. According to the tenth embodiment, the SETUP message which is relayed by more ATM switches is preferentially received in preference to the others when the same priority is given to all the SETUP messages. The number of ATM switches which relayed the SETUP message is defined as a hop number hereafter. In the example, the SETUP message from the ATM terminal 140C is preferentially received since the hop number of this message is larger than that of the SETUP message from the ATM terminal 140B.

FIG. 25 shows a hop number table 21200. The hop number table 21200 includes a plurality of entry sets, each comprising the ATM address 21210 and the hop number 21220. The hop number table 21200 included in the ATM switch 100A specifies the ATM addresses of a, b, c and the hop numbers 21220 of 0, 1, 2 when the ATM terminals 140A, 140B, 140C are assumed to be the originator respectively. An example of a method for calculating the hop number is described. In this example, the SETUP message is provided with information specifying the hop number, and the hop number is incremented at each of the relaying ATM switches every time the SETUP message is relayed. The ATM switch 100A is structured so as to be able to generate the hop number table 21200 by extracting and reading the hop number from the received SETUP message.

In the present embodiment, a plurality of queues are additionally provided at the priority queue described in the sixth to ninth embodiments in correspondence with values of the hop number (called priority sub-queue hereafter), and the SETUP message is branched and stored in the priority sub-queue which corresponds to the hop number of the SETUP message. In this example, the ATM address of the originator is stored as the calling party number 2660 of the SETUP message. Therefore, by reading the calling party number 2660 and consulting the HOP number table 21200, the SETUP message is branched and stored in the priority sub-queue corresponding to its hop number in the branching process shown in FIG. 14. In the extracting process shown in FIG. 14, the SETUP messages stored in the priority sub-queue is extracted according to a predetermined algorithm. Here, the SETUP message with a higher hop number may be preferentially received in the receiving operation by assigning a higher priority to the priority sub-queue corresponding to higher hop number.

According to the present embodiment, the connection receiving priority control may be accomplished while a number of relayed ATM switches is taken into account. In the example described above, the ATM switch 100A is able to receive the SETUP message from the ATM terminal 140C preferentially over the SETUP message from the ATM terminal 140B. Furthermore, it is able to reduce occurrences of such a case where resources once appointed at the relayed ATM switches are to be wasted.

Although the priority sub-queue corresponding to the hop number is provided in the priority queue described in the sixth-ninth embodiments in the present embodiment, it is also possible to have only priority queues provided in correspondence with values of the hop number in advance.

According to the sixth-tenth embodiments, it is possible to establish the connection efficiently at the ATM switch by classifying ATM devices connected to the ATM switch and processing the classified SETUP message according to the sequence of priority so as to preferentially process an important connection setup request or to give preference to the connection setup request which has been relayed by many ATM switches. Furthermore, it is possible to reduce occurrences of such a case where resources once appointed at the relayed ATM switches are to be wasted by taking the number of relayed ATM switches into account.

What is claimed is:

1. An ATM switch exchanging inputted connections, comprising:

reception means receiving a connection setup request, storage means storing the connection setup request received by said reception means, establishment means extracting the connection setup request stored in said storage means and establishing the connection according to the extracted connection setup request, detection means detecting a class having a predetermined number of connection setup requests which are stored in said storage means and classified into said class that is equal to a maximum number of connection setup requests for said class, the stored connection setup requests being classified into a plurality of classes, each respectively assigned with a maximum acceptable number of setup requests, and discard means discarding the connection setup request received by said reception means if the detection means detects said class and the received connection setup request belongs to said class.

2. An ATM switch in accordance with claim 1, wherein said reception means is provided with a plurality of ports connected to external devices, and said ATM switch further comprising, definition means assigning the class to each of said ports to which the connection setup requests are inputted, distinction means distinguishing said port to which the connection setup request stored in said storage means has been inputted, and identification means identifying said class corresponding to said port distinguished by said distinction means.

3. An ATM switch in accordance to claim 1, further comprising, definition means assigning the class beforehand to each of service types included in the connection setup request, distinction means distinguishing said service type of the connection setup request stored in said storage means, and identification means identifying said class corresponding to said service type distinguished by said distinction means.

4. An ATM switch in accordance with claim 1, wherein, said detection means comprises, counter means counting a number of connection setup requests stored in said storage means for each of the classes, memory means memorizing said predetermined numbers of the connection setup requests for each of the classes, and comparison means comparing the number of the connection setup requests counted by said counter means and the corresponding predetermined number of connection setup requests memorized by said memory means, and checking if the number of the connection setup requests counted by said counter means is equal to the corresponding predetermined number of connection setup requests memorized by said memory means.

5. An ATM switch in accordance with claim 1, wherein, said discard means discard the connection setup request of said such a class stored in said storage means instead of discarding the connection setup request of said such a class received by said reception means when said detection means detects said such a class.

6. An ATM switch in accordance with claim 1, wherein, said discard means sends a message to an originator of the discarded connection setup request when the setup request is discarded, said message indicating discard of the connection setup request.

7. An ATM switch in accordance with claim 1, wherein, said detection means includes modification means changing said predetermined number of connection setup requests for each of the classes.

8. A congestion control method of an ATM switch receiving a connection setup request, storing the received connection setup request, extracting the stored connection setup request and establishing the connection according to the extracted connection setup request, comprising the steps of, detecting a class having a predetermined number of the stored connection setup requests pre-assigned to said class and classified into said class that is equal to a maximum number of the stored connection setup requests for said class, the stored connection setup requests being classified into a plurality of the classes, and discarding the received connection setup request if said class is detected and the received connection setup request belongs to the detected class.

9. A congestion control method of an ATM switch receiving a connection setup request, storing the received connection setup request, extracting the stored connection setup request and establishing the connection according to the extracted connection setup request, comprising the steps of, detecting a class having a predetermined number of stored connection setup requests pre-assigned to said class and classified into said class that are equal to a maximum number of stored connection setup requests for said class, the stored connection setup requests being classified into a plurality of classes, and discarding the stored connection setup request if said class is detected and the stored connection setup request belongs to the detected class.

10. An ATM switch exchanging inputted connections, comprising:

reception means receiving a connection setup request, distinction means distinguishing a priority corresponding to content of the connection setup request which is received by said reception means, by using a condition in which said priority is defined and preferentially receiving the connection setup request in correspondence with the content of the connection setup request, storage means storing the connection setup request for each of said priorities distinguished by said distinction means, extraction means extracting the connection setup request corresponding to said priority to be extracted according to an algorithm which is defined based on said priority for extracting the connection setup request, and establishment means establishing the connection according to the extracted connection setup request.

11. An ATM switch in accordance with claim 10, wherein, said reception means is provided with a plurality of ports each connected to external devices, and said distinction means distinguishes said priority by pre-assigning said priority to each of said ports, distinguishing said port by which the connection setup request is received, and identifying said priority in correspondence with the distinguished port.

12. An ATM switch in accordance with claim 10, wherein, said distinction means distinguishes said priority by pre-defining said priority in correspondence with a predetermined information element parameter which is added to the connection setup request, distinguishing said information element parameter added to the connection setup request, and identifying said priority in correspondence with the distinguished information element parameter.

13. An ATM switch in accordance with claim 10, wherein, said distinction means distinguishes said priority by, assigning said priority beforehand in correspondence with a number of external devices through which the connection setup request passed, said number of external devices corresponding to originator information added to the connection setup request, distinguishing said number of external devices passed through from said originator information added to the connection setup request, and identifying said priority in correspondence with said number of external devices passed through.

14. An ATM switch in accordance with claim 10, further comprising, detection means detecting if a number of the connection setup requests stored in said storage means is equal to a predetermined number, definition means defining a discarding priority to specify a discarding sequence of the connection setup requests for each of said priority of said storage means, and discard means discarding the connection setup request which is extracted from said storage means and belongs to said discarding priority to be discarded, if the detection is obtained at said detection means, according to a predetermined algorithm which is defined based on said discarding priority for discarding the connection setup request.

15. An ATM switch in accordance with claim 14, wherein, said discard means sends a message to a originator of the discarded connection setup request when the connection setup request is discarded, said message indicating discard of the connection setup request.

16. An ATM switch in accordance with claim 14, wherein, said detection means includes modification means changing said predetermined number for each of said priorities.

17. An ATM switch in accordance with claim 10, wherein, said extraction means extracts the connection setup request from said storage means, by detecting originators of each connection setup request and determining the connection setup request to be extracted depending on the detected originator if a plurality of the connection setup requests are stored under the same priority in said storage means.

18. An ATM switch in accordance with claim 17, wherein, said extraction means detects a number of external devices through which the connection setup request passed from said detected originator of the connection setup request, and preferentially extracts the connection setup request which passed through the most external devices.

19. A priority control method for receiving connection setup requests for an ATM switch exchanging the inputted connections, comprising the steps of, receiving the connection setup request, distinguishing a priority corresponding to content of the received connection setup requests by using a condition which defines said priority in correspondence with said content of the connection setup request and preferentially receiving the connection setup request, storing the connection setup request for each of said priorities distinguished, extracting the connection setup request corresponding to said priority to be extracted according to an algorithm, which is defined based on said priority, for extracting the connection setup request, and establishing the connection according to the extracted connection setup request.

* * * * *